US012289587B2

(12) United States Patent
Usami et al.

(10) Patent No.: US 12,289,587 B2
(45) Date of Patent: Apr. 29, 2025

(54) ACOUSTIC REPRODUCTION METHOD, RECORDING MEDIUM, AND ACOUSTIC REPRODUCTION DEVICE

(71) Applicant: Panasonic Intellectual Property Corporation of America, Torrance, CA (US)

(72) Inventors: Hikaru Usami, Osaka (JP); Tomokazu Ishikawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 273 days.

(21) Appl. No.: 18/104,869

(22) Filed: Feb. 2, 2023

(65) Prior Publication Data

US 2023/0319472 A1 Oct. 5, 2023

Related U.S. Application Data

(63) Continuation of application No. PCT/JP2021/026595, filed on Jul. 15, 2021.

(Continued)

(30) Foreign Application Priority Data

Jun. 10, 2021 (JP) ................................. 2021-097595

(51) Int. Cl.

*H04R 5/02* (2006.01)
*H04R 1/40* (2006.01)

(Continued)

(52) U.S. Cl.

CPC ............... *H04R 5/02* (2013.01); *H04R 1/403* (2013.01); *H04R 3/12* (2013.01); *H04R 5/04* (2013.01)

(58) Field of Classification Search

CPC . H04R 5/02; H04R 1/403; H04R 3/12; H04R 5/04

See application file for complete search history.

(56) References Cited

U.S. PATENT DOCUMENTS

2005/0244010 A1 11/2005 Kuwahara et al.
2014/0270183 A1* 9/2014 Luna ......................... H04S 7/30 381/17

FOREIGN PATENT DOCUMENTS

JP 2005-287002 10/2005

OTHER PUBLICATIONS

International Search Report issued Sep. 14, 2021 in International (PCT) Application No. PCT/JP2021/026595.

(Continued)

*Primary Examiner* — Mark Fischer

(74) *Attorney, Agent, or Firm* — Wenderoth, Lind & Ponack, L.L.P.

(57) ABSTRACT

An acoustic reproduction method includes: acquiring a first audio signal corresponding to an ambient sound that arrives at a listener from a first range in a sound reproduction space and a second audio signal corresponding to a target sound that arrives at the listener from a point in the sound reproduction space; acquiring direction information about the listener; performing, when a back range of the listener is determined to include the first range and the point based on the direction information, correction processing such that the first range does not overlap the point when the sound reproduction space is viewed in a predetermined direction; and mixing at least one of the first audio signal or the second audio signal and outputting the at least one thereof to an output channel.

13 Claims, 15 Drawing Sheets

Related U.S. Application Data

(60) Provisional application No. 63/068,010, filed on Aug. 20, 2020.

(51) Int. Cl.
*H04R 3/12* (2006.01)
*H04R 5/04* (2006.01)

(56) References Cited

OTHER PUBLICATIONS

Yukio Iwaya, "Sound localization by head-related transfer functions: Data sets and issues for individualization of head-related transfer functions", The Journal of the Acoustical Society of Japan, vol. 73, No. 3, 2017, pp. 173-180 with partial English translation.
Kazuhiro Iida et al., "Median plane localization using a parametric model of the head-related transfer function based on spectral cues", Applied Acoustics, vol. 68, 2007, pp. 835-850.

* cited by examiner

ACOUSTIC REPRODUCTION METHOD, RECORDING MEDIUM, AND ACOUSTIC REPRODUCTION DEVICE

CROSS REFERENCE TO RELATED APPLICATIONS

This is a continuation application of PCT International Application No. PCT/JP2021/026595 filed on Jul. 15, 2021, designating the United States of America, which is based on and claims priority of U.S. Provisional Patent Application No. 63/068,010 filed on Aug. 20, 2020 and Japanese Patent Application No. 2021-097595 filed on Jun. 10, 2021. The entire disclosures of the above-identified applications, including the specifications, drawings and claims are incorporated herein by reference in their entirety.

FIELD

The present disclosure relates to acoustic reproduction methods and the like.

BACKGROUND

Patent Literature (PTL) 1 proposes a technique on a stereophonic acoustic reproduction system in which a plurality of loudspeakers arranged around a listener are caused to output sounds and thus realistic acoustic sound is realized.

CITATION LIST

Patent Literature

PTL 1: Japanese Unexamined Patent Application Publication No, 2005-287002

SUMMARY

Technical Problem

Incidentally, a human (here, a listener who hears sound) has a low level of perception of a sound arriving from behind the listener as compared with a sound arriving from in front of the listener among sounds arriving at the listener from the surroundings.

Hence, an object of the present disclosure is to provide an acoustic reproduction method for enhancing the level of perception of a sound arriving from behind a listener and the like.

Solution to Problem

An acoustic reproduction method according to an aspect of the present disclosure includes: acquiring a first audio signal corresponding to an ambient sound that arrives at a listener from a first range which is a range of a first angle in a sound reproduction space and a second audio signal corresponding to a target sound that arrives at the listener from a point in a first direction in the sound reproduction space; acquiring direction information about a direction in which a head of the listener faces; performing, when a back range relative to a front range in the direction in which the head of the listener faces is determined to include the first range and the point based on the direction information acquired, correction processing on at least one of the first audio signal acquired or the second audio signal acquired such that the first range does not overlap the point when the sound reproduction space is viewed in a predetermined direction; and mixing at least one of the first audio signal on which the correction processing has been performed or the second audio signal on which the correction processing has been performed and outputting, to an output channel, the at least one of the first audio signal or the second audio signal which has undergone the mixing.

A recording medium according to an aspect of the present disclosure is a non-transitory computer-readable recording medium having recorded thereon a computer program for causing a computer to execute the acoustic reproduction method described above.

An acoustic reproduction device according to an aspect of the present disclosure includes: a signal acquirer that acquires a first audio signal corresponding to an ambient sound that arrives at a listener from a first range which is a range of a first angle in a sound reproduction space and a second audio signal corresponding to a target sound that arrives at the listener from a point in a first direction in the sound reproduction space; an information acquirer that acquires direction information about a direction in which a head of the listener faces; a correction processor that performs, when a back range relative to a front range in the direction in which the head of the listener faces is determined to include the first range and the point based on the direction information acquired, correction processing on at least one of the first audio signal acquired or the second audio signal acquired such that the first range does not overlap the point when the sound reproduction space is viewed in a predetermined direction; and a mixing processor that mixes at least one of the first audio signal on which the correction processing has been performed or the second audio signal on which the correction processing has been performed and outputs, to an output channel, the at least one of the first audio signal or the second audio signal which has undergone the mixing.

These comprehensive or specific aspects may be realized by a system, a device, a method, an integrated circuit, a computer program, or a non-transitory computer-readable recording medium such as a CD-ROM or may be realized by any combination of a system, a device, a method, an integrated circuit, a computer program, and a recording medium.

Advantageous Effects

In the acoustic reproduction method and the like according to the aspects of the present disclosure, the level of perception of a sound arriving from behind a listener can be enhanced.

Figure 1:
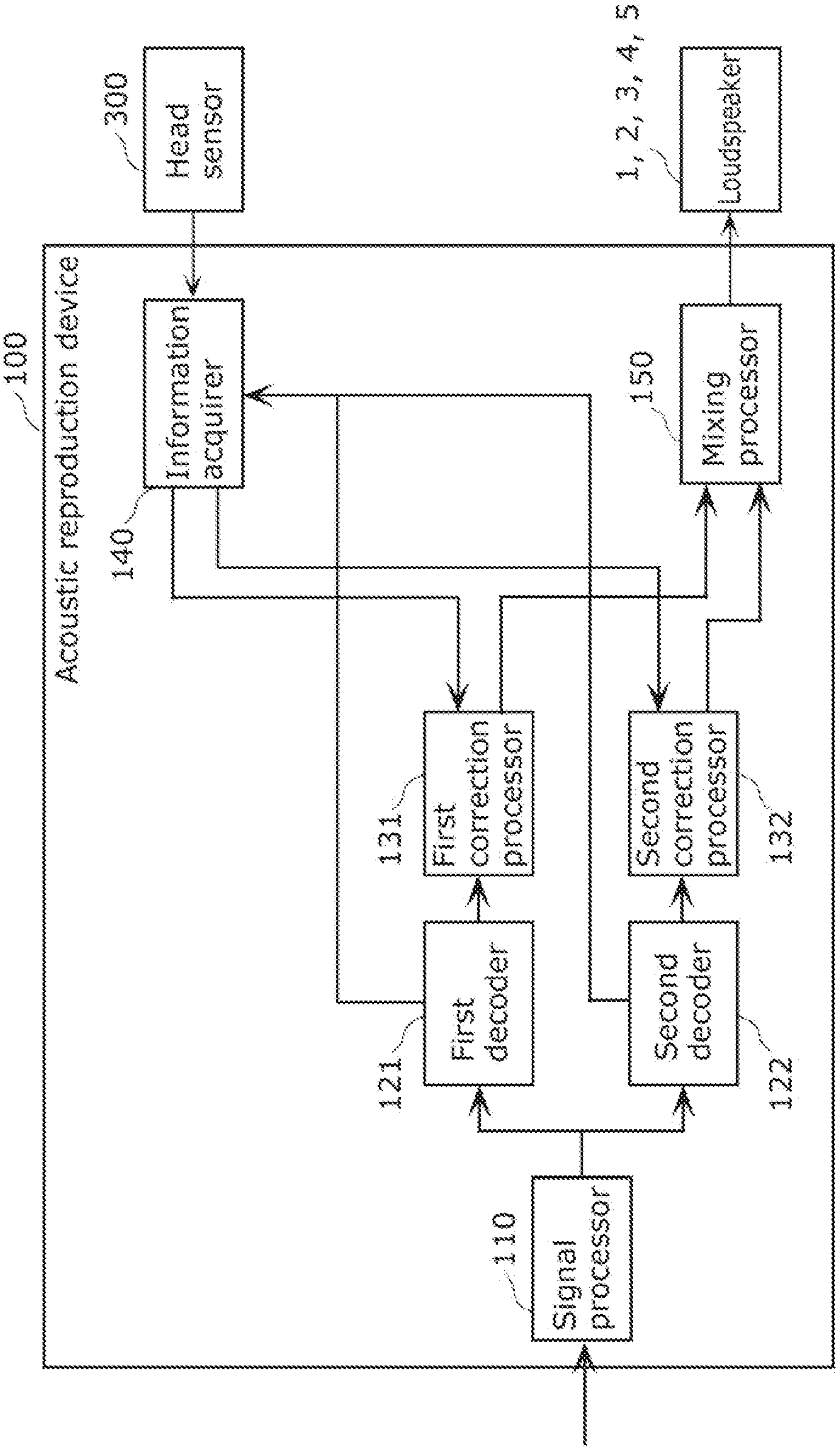
FIG. 1 is a block diagram showing the functional configuration of an acoustic reproduction device according to an embodiment.

DESCRIPTION OF EMBODIMENTS (Underlying Knowledge Forming Basis of the Present Disclosure)

Conventionally, a technique on acoustic reproduction is known in which sounds indicated by a plurality of different audio signals are output from a plurality of loudspeakers arranged around a listener and thus realistic acoustic sound is realized.

For example, the stereophonic acoustic reproduction system disclosed in PTL 1 includes a main loudspeaker, a surround loudspeaker, and a stereophonic acoustic reproduction device.

The main loudspeaker amplifies a sound indicated by a main audio signal in a position where a listener is placed within a directivity angle, the surround loudspeaker amplifies a sound indicated by a surround audio signal toward the wall surface of a sound field space, and the stereophonic acoustic reproduction device performs sound amplification on each of the loudspeakers.

The stereophonic acoustic reproduction device includes a signal adjustment means, a delay time addition means, and an output means. The signal adjustment means adjusts, based on a propagation environment at the time of sound amplification, frequency characteristics on the surround audio signal. The delay time addition means adds a delay time corresponding to the surround signal to the main audio signal. The output means outputs, to the main loudspeaker, the main audio signal to which the delay time has been added, and outputs, to the surround loudspeaker, the surround audio signal which has been adjusted.

The stereophonic acoustic reproduction system as described above can create a sound field space which provides an enhanced sense of realism.

Incidentally, a human (here, a listener who hears sound) has a low level of perception of a sound arriving from behind the listener as compared with a sound arriving from in front of the listener among sounds arriving at the listener from the surroundings. For example, the human has such perceptual characteristics (more specifically, hearing characteristics) as to have difficulty perceiving the position, the direction, or the like of a sound arriving at the human from behind the human. The perceptual characteristics described above are characteristics derived from the shape of an auricle and a discrimination limit in the human.

When two types of sounds (for example, a target sound and an ambient sound) arrive at a listener from behind the listener, one of the sounds (for example, the target sound) may be buried in the other sound (for example, the ambient sound). In this case, the listener has difficulty hearing the target sound, and thus it is difficult to perceive the position, the direction, or the like of the target sound arriving from behind the listener.

As an example, in the stereophonic acoustic reproduction system disclosed in PTL 1, when the sound indicated by the main audio signal and the sound indicated by the surround audio signal arrive from behind the listener, the listener has difficulty perceiving the sound indicated by the main audio signal, Hence, an acoustic reproduction method for enhancing the level of perception of a sound arriving from behind a listener and the like are required.

Hence, an acoustic reproduction method according to an aspect of the present disclosure includes: acquiring a first audio signal corresponding to an ambient sound that arrives at a listener from a first range which is a range of a first angle in a sound reproduction space and a second audio signal corresponding to a target sound that arrives at the listener from a point in a first direction in the sound reproduction space; acquiring direction information about a direction in which a head of the listener faces; performing, when a back range relative to a front range in the direction in which the head of the listener faces is determined to include the first range and the point based on the direction information acquired, correction processing on at least one of the first audio signal acquired or the second audio signal acquired such that the first range does not overlap the point when the sound reproduction space is viewed in a predetermined direction; and mixing at least one of the first audio signal on which the correction processing has been performed or the second audio signal on which the correction processing has been performed and outputting, to an output channel, the at least one of the first audio signal or the second audio signal which has undergone the mixing.

In this way, when the first range and the point are included in the back range, the correction processing is performed such that the first range does not overlap the point. Hence, burying of the target sound whose sound image is localized at the point in the ambient sound whose sound image is localized in first range is suppressed, and thus the listener easily hears the target sound which arrives at the listener from behind the listener. In other words, the acoustic reproduction method is realized which can enhance the level of perception of a sound arriving from behind the listener.

For example, the first range is a back range relative to a reference direction which is determined by a position of the output channel.

In this way, even when the ambient sound arrives at the listener from the back range relative to the reference direction, the listener easily hears the target sound which arrives at the listener from behind the listener.

For example, the predetermined direction is a second direction toward the listener from above the listener.

In this way, when the sound reproduction space is viewed from above the listener, the first range does not overlap the point, Consequently, the listener easily hears the target sound which arrives at the listener from behind the listener. In other words, the acoustic reproduction method is realized which can enhance the level of perception of the sound arriving from behind the listener.

For example, the first range indicated by the first audio signal on which the correction processing has been performed includes: a second range that is a range of a second angle; and a third range that is a range of a third angle different from the second angle, the ambient sound arrives at the listener from the second range and the third range, and when the sound reproduction space is viewed in the second direction, the second range does not overlap the point, and the third range does not overlap the point.

In this way, the ambient sound arrives at the listener from the second range and the third range, that is, two ranges. Hence, it is possible to enhance the level of perception of the sound which arrives from behind the listener, and the acoustic reproduction method is realized in which the listener can hear the expansive ambient sound.

For example, the predetermined direction is a third direction toward the listener from a side of the listener.

In this way, when the sound reproduction space is viewed from the side of the listener, the first range does not overlap the point. Consequently, the listener easily hears the target sound which arrives at the listener from behind the listener. In other words, the acoustic reproduction method is realized which can enhance the level of perception of the sound arriving from behind the listener.

For example, when the sound reproduction space is viewed in the third direction, the ambient sound indicated by the first audio signal acquired arrives at the listener from the first range that is a range of a fourth angle in the sound reproduction space, and the target sound indicated by the second audio signal acquired arrives at the listener from the point in a fourth direction in the sound reproduction space, and in the performing of the correction processing, when the fourth direction is determined to be included in the fourth angle, the correction processing is performed on the at least one of the first audio signal acquired or the second audio signal acquired such that the fourth direction does not overlap the first range when the sound reproduction space is viewed in the third direction.

In this way, when the sound reproduction space is viewed from the side of the listener, the first range does not overlap the point, and the first range does not overlap the fourth direction. Consequently, the listener easily hears the target sound which arrives at the listener from behind the listener. In other words, the acoustic reproduction method is realized which can enhance the level of perception of the sound arriving from behind the listener.

For example, the correction processing is processing that adjusts an output level of the at least one of the first audio signal acquired or the second audio signal acquired.

In this way, the listener more easily hears the target sound which arrives at the listener from behind the listener. In other words, the acoustic reproduction method is realized which can enhance the level of perception of the sound arriving from behind the listener.

For example, in the mixing, the at least one of the first audio signal on which the correction processing has been performed or the second audio signal on which the correction processing has been performed is mixed, and the at least one of the first audio signal or the second audio signal which has undergone the mixing is output to a plurality of output channels each being the output channel, and the correction processing is processing that adjusts an output level of the at least one of the first audio signal acquired or the second audio signal acquired in each of the plurality of output channels, the each of the plurality of output channels outputting the at least one of the first audio signal or the second audio signal.

In this way, the listener more easily hears the target sound which arrives at the listener from behind the listener. In other words, the acoustic reproduction method is realized which can enhance the level of perception of the sound arriving from behind the listener.

For example, the correction processing is processing that adjusts, based on an output level of the first audio signal corresponding to the ambient sound arriving at the listener from the first range, an output level in each of the plurality of output channels, the each of the plurality of output channels outputting the second audio signal.

In this way, the listener more easily hears the target sound which arrives at the listener from behind the listener. In other words, the acoustic reproduction method is realized which can enhance the level of perception of the sound arriving from behind the listener.

For example, the correction processing is processing that adjusts an angle corresponding to a head-related transfer function which is convoluted into the at least one of the first audio signal acquired or the second audio signal acquired.

In this way, the listener more easily hears the target sound which arrives at the listener from behind the listener. In other words, the acoustic reproduction method is realized which can enhance the level of perception of the sound arriving from behind the listener.

For example, the correction processing is processing that adjusts, based on an angle corresponding to a head-related transfer function which is convoluted into the first audio signal such that the ambient sound indicated by the first audio signal arrives at the listener from the first range, an angle corresponding to a head-related transfer function which is convoluted into the second audio signal.

In this way, the listener more easily hears the target sound which arrives at the listener from behind the listener. In other words, the acoustic reproduction method is realized which can enhance the level of perception of the sound arriving from behind the listener.

For example, a recording medium according to an aspect of the present disclosure may be a non-transitory computer-readable recording medium having recorded thereon a computer program for causing a computer to execute the acoustic reproduction method described above.

In this way, the computer can execute the acoustic reproduction method described above according to the program.

For example, an acoustic reproduction device according to an aspect of the present disclosure includes: a signal acquirer that acquires a first audio signal corresponding to an ambient sound that arrives at a listener from a first range which is a range of a first angle in a sound reproduction space and a second audio signal corresponding to a target sound that arrives at the listener from a point in a first direction in the sound reproduction space; an information acquirer that acquires direction information about a direction in which a head of the listener faces; a correction processor that performs, when a back range relative to a front range in the direction in which the head of the listener faces is determined to include the first range and the point based on the direction information acquired, correction processing on at least one of the first audio signal acquired or the second audio signal acquired such that the first range does not overlap the point when the sound reproduction space is viewed in a predetermined direction; and a mixing processor that mixes at least one of the first audio signal on which the correction processing has been performed or the second audio signal on which the correction processing has been performed and outputs, to an output channel, the at least one of the first audio signal or the second audio signal which has undergone the mixing.

In this way, when the first range and the point are included in the back range, the correction processing is performed such that the first range does not overlap the point. Hence, burying of the target sound whose sound image is localized at the point in the ambient sound whose sound image is localized in first range is suppressed, and thus the listener easily hears the target sound which arrives at the listener from behind the listener. In other words, the acoustic reproduction device is realized which can enhance the level of perception of the sound arriving from behind the listener.

Furthermore, these comprehensive or specific aspects may be realized by a system, a device, a method, an integrated circuit, a computer program, or a non-transitory computer-readable recording medium such as a CD-ROM or may be realized by any combination of a system, a device, a method, an integrated circuit, a computer program, and a recording medium.

Embodiments will be specifically described below with reference to drawings.

The embodiments each which will be described below show comprehensive or specific examples. Values, shapes, materials, constituent elements, the arrangement, the positions, and the connection form of the constituent elements, steps, the order of the steps, and the like are examples and are not intended to limit the scope of claims.

In the following description, ordinal numbers such as first, second, and third may be added to elements. These ordinal numbers are added to the elements in order to identify the elements, and do not necessarily correspond to a meaningful order. These ordinal numbers may be replaced, may be additionally provided, or may be removed as necessary.

The drawings each are schematic views and are not exactly shown. Hence, in the drawings, scales and the like are not necessarily the same. In the drawings, substantially the same configurations are identified with the same symbols, and repeated description is omitted or simplified.

In the present specification, a term such as parallel or vertical which indicates a relationship between elements or the range of a value is not an expression which indicates only an exact meaning but an expression which means a substantially equivalent range including, for example, a difference of about several percent.

Embodiment 1

[Configuration]

Figure 2:
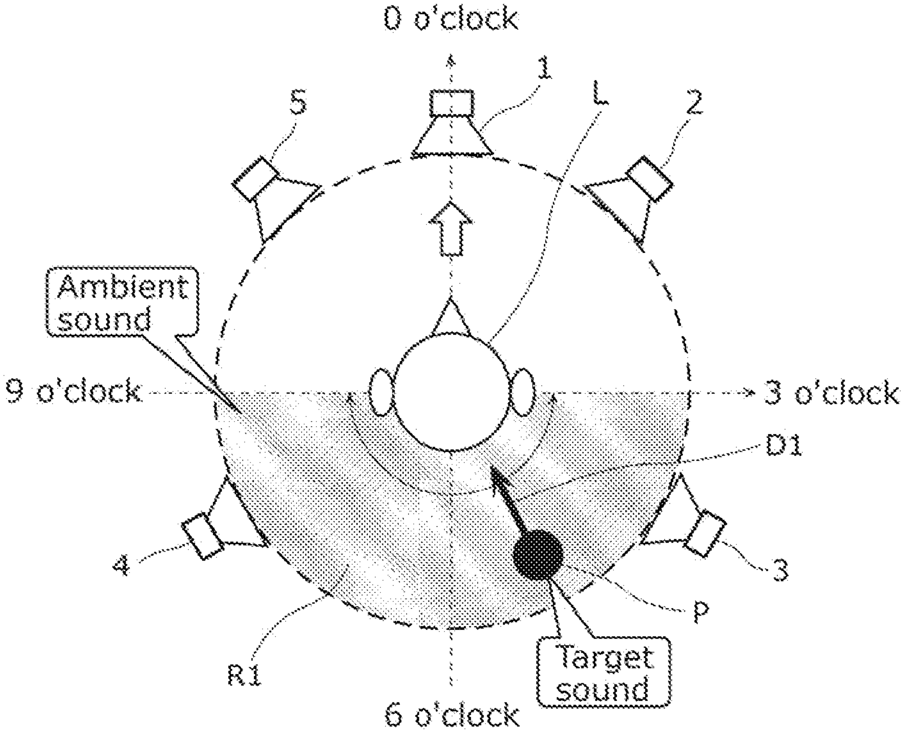
FIG. 2 is a schematic view showing an example of use of sounds output from a plurality of loudspeakers in the embodiment.

The configuration of acoustic reproduction device 100 according to Embodiment 1 will first be described. FIG. 1 is a block diagram showing the functional configuration of acoustic reproduction device 100 according to the present embodiment. FIG. 2 is a schematic view showing an example of use of sounds output from a plurality of loudspeakers 1 to 5 in the present embodiment. FIG. 2 is a diagram when a sound reproduction space is viewed in a second direction toward listener L from above listener L. More specifically, the second direction is a direction toward listener L from above the head of listener L along a vertically downward direction.

Acoustic reproduction device 100 according to the present embodiment is a device which performs processing on a plurality of audio signals acquired and outputs the audio signals to loudspeakers 1 to 5 in the sound reproduction space shown in FIG. 2 to cause listener L to hear sounds indicated by the audio signals. More specifically, acoustic reproduction device 100 is a stereophonic acoustic reproduction device for causing listener L to hear stereophonic acoustic sound in the sound reproduction space. The sound reproduction space is a space in which listener L and loudspeakers 1 to 5 are arranged. In the present embodiment, as an example, acoustic reproduction device 100 is utilized in a state where listener L stands on the floor surface of the sound reproduction space. Here, the floor surface is a surface parallel to a horizontal plane.

Acoustic reproduction device 100 performs the processing on the acquired audio signals based on direction information output by head sensor 300. The direction information is information about a direction in which the head of listener L faces. The direction in which the head of listener L faces is also a direction in which the face of listener L faces.

Head sensor 300 is a device which senses the direction in which the head of listener L faces. Head sensor 300 is preferably a device which senses the information of sixth degrees of freedom (DOF) in the head of listener L. For example, head sensor 300 is a device which is fitted to the head of listener L, and is preferably an inertial measurement unit (IMU), an accelerometer, a gyroscope, a magnetic sensor, or a combination thereof.

As shown in FIG. 2, in the present embodiment, a plurality of (here, five) loudspeakers 1 to 5 are arranged to surround listener L. In the sound reproduction space shown in FIG. 2, in order to illustrate directions, 0 o'clock, 3 o'clock, 6 o'clock, and 9 o'clock are shown to correspond to times indicated by a clock face. An open arrow indicates the direction in which the head of listener L faces, and in FIG. 2, the direction in which the head of listener L located in the center (also referred to as the origin point) of the clock face faces is a 0 o'clock direction. In the following description, a direction between listener L and 0 o'clock may also be referred to as the "0 o'clock direction", and the same is true for the other times indicated by the clock face.

In the present embodiment, fixe loudspeakers 1 to 5 are formed using a center loudspeaker, a front right loudspeaker, a rear right loudspeaker, a rear left loudspeaker, and a front left loudspeaker, Here, loudspeaker 1 which is the center loudspeaker is arranged in the 0 o'clock direction. For example, loudspeaker 2 is arranged in a 1 o'clock direction, loudspeaker 3 is arranged in a 4 o'clock direction, loudspeaker 4 is arranged in an 8 o'clock direction, and loudspeaker 5 is arranged in an 11 o'clock direction.

Five loudspeakers 1 to 5 each are sound amplification devices which output sounds indicated by the audio signals output from acoustic reproduction device 100.

Here, acoustic reproduction device 100 will be described in further detail.

As shown in FIG. 1, acoustic reproduction device 100 includes signal processor 110, first decoder 121, second decoder 122, first correction processor 131, second correction processor 132, information acquirer 140, and mixing processor 150.

Signal processor 110 is a processor which acquires the audio signals. Signal processor 110 may acquire the audio signals by receiving the audio signals transmitted by other constituent elements which are not shown in FIG. 2 or may acquire the audio signals stored in a storage device which is not shown in FIG. 2. The audio signals acquired by signal processor 110 are signals which include the first audio signal and the second audio signal.

Here, the first audio signal and the second audio signal will be described.

The first audio signal is a signal corresponding to an ambient sound arriving at listener L from first range R1 which is the range of a first angle in the sound reproduction space. More specifically, as shown in FIG. 2, the first audio signal is a signal which corresponds to, when the sound reproduction space is viewed in the second direction, the ambient sound arriving at listener L from first range R1 which is the range of the first angle relative to listener L.

For example, first range R1 is a back range in a reference direction determined by the positions of five loudspeakers 1 to 5 which are a plurality of output channels. Although in the present embodiment, the reference direction is a direction toward loudspeaker 1 serving as the center loudspeaker from listener L and is, for example, the 0 o'clock direction, the reference direction is not limited to this direction. A backward direction relative to the 0 o'clock direction serving as the reference direction is a 6 o'clock direction, and first range R1 preferably includes the 6 o'clock direction which is the backward direction relative to the reference direction. As indicated by a double-headed arrow in FIG. 2, first range R1 is a range from a 3 o'clock direction to a 9 o'clock direction (that is, an angular range of) 180°, and is a dotted region in FIG. 2, First range R1 is not limited to this range, and may be, for example, a range less than 180° or a range greater than 180°. Since the reference direction is constant regardless of the direction in which the head of listener L faces, first range R1 is also constant regardless of the direction in which the head of listener L faces.

The ambient sound is a sound which arrives at listener L from all or a part of first range R1 that is expansive as described above. The ambient sound may also be referred to as so-called noise or ambient sound. In the present embodiment, the ambient sound is a sound which arrives at listener L from all regions in first range R1. Here, the ambient sound is a sound which arrives at listener L from the entire dotted region in FIG. 2. In other words, the ambient sound is, for example, a sound in which a sound image is localized over the entire dotted region in FIG. 2.

The second audio signal is a signal corresponding to a target sound arriving at listener L from point P in first direction D1 in the sound reproduction space. More specifically, as shown in FIG. 2, the second audio signal is a signal which corresponds to, when the sound reproduction space is viewed in the second direction, the target sound arriving at listener L from point P in first direction D1 relative to listener L. Point P described above is a point which is located a predetermined distance from listener L in first direction D1, and is, for example, a black point shown in FIG. 2.

The target sound is a sound in which a sound image is localized at this black point (point P). The target sound is a sound which arrives at listener L from a narrow range as compared with the ambient sound. The target sound is a sound which is mainly heard by listener L. The target sound is also said to be a sound other than the ambient sound.

As shown in FIG. 2, in the present embodiment, first direction D1 is a 5 o'clock direction, and an arrow indicates that the target sound arrives at listener L in first direction D1. First direction D1 is not limited to the 5 o'clock direction, and may be another direction as long as first direction D1 is a direction toward listener L from a position (here, point P) in which the sound image of the target sound is localized. First direction D1 and point P are constant regardless the direction in which the head of listener L faces.

In the description of the present embodiment, unless otherwise specified, point P in first direction D1 is a point which has no size. However, the present embodiment is not limited to this configuration, and point P in first direction D1 may mean a region which has a size. Even in this case, the region indicating point P in first direction D1 is a range narrower than first range R1.

In the arrangement of five loudspeakers 1 to 5, the ambient sound is output using (selecting) a plurality of loudspeakers so as to be distributed in a predetermined range. The target sound is output using (selecting) one or more loudspeakers, for example, with a method called panning by adjusting output levels from the loudspeakers so as to be localized in a predetermined position. The panning refers to a method or a phenomenon in which the localization of a virtual sound image between a plurality of loudspeakers is expressed (perceived) under control of output levels by a difference between the output levels of the loudspeakers.

Signal processor 110 will be described again.

Signal processor 110 further performs processing to separate a plurality of audio signals into the first audio signal and the second audio signal. Signal processor 110 outputs the separated first audio signal to first decoder 121, and outputs the separated second audio signal to second decoder 122. Although in the present embodiment, an example of signal processor 110 is a demultiplexer, signal processor 110 is not limited to the demultiplexer.

In the present embodiment, the audio signals acquired by signal processor 110 are preferably subjected to encoding processing such as MPEG-H 3D Audio (ISO/IEC 23008-3) (hereinafter referred to as MPEG-H 3D Audio) . . . . In other words, signal processor 110 acquires the audio signals which are encoded bitstreams.

First decoder 121 and second decoder 122 which are examples of a signal acquirer acquire the audio signals. Specifically, first decoder 121 acquires and decodes the first audio signal separated by signal processor 110. Second decoder 122 acquires and decodes the second audio signal separated by signal processor 110. First decoder 121 and second decoder 122 perform decoding processing based on MPEG-H 3D Audio described above or the like.

First decoder 121 outputs the decoded first audio signal to first correction processor 131, and second decoder 122 outputs the decoded second audio signal to second correction processor 132.

First decoder 121 outputs, to information acquirer 140, first information which is included in the first audio signal and indicates first range R1. Second decoder 122 outputs, to information acquirer 140, second information which is included in the second audio signal and indicates point P in first direction D1.

Information acquirer 140 is a processor which acquires the direction information output from head sensor 300. Information acquirer 140 acquires the first information output by first decoder 121 and the second information output by second decoder 122, Information acquirer 140 outputs, to first correction processor 131 and second correction processor 132, the direction information, the first information, and the second information which are acquired.

First correction processor 131 and second correction processor 132 are examples of a correction processor. The correction processor is a processor which performs correction processing on at least one of the first audio signal or the second audio signal.

First correction processor 131 acquires the first audio signal acquired by first decoder 121 and the direction information, the first information, and the second information acquired by information acquirer 140. Second correction processor 132 acquires the second audio signal acquired by second decoder 122 and the direction information, the first information, and the second information acquired by information acquirer 140.

When a predetermined condition is satisfied, the correction processor (first correction processor 131 and second correction processor 132) performs, based on the acquired direction information, the correction processing on at least one of the first audio signal or the second audio signal. More specifically, first correction processor 131 performs the correction processing on the first audio signal, and second correction processor 132 performs the correction processing on the second audio signal.

Here, when the correction processing is performed on the first audio signal and the second audio signal, first correction processor 131 outputs, to mixing processor 150, the first audio signal on which the correction processing has been performed, and second correction processor 132 outputs, to mixing processor 150, the second audio signal on which the correction processing has been performed.

When the correction processing is performed on the first audio signal, first correction processor 131 outputs, to mixing processor 150, the first audio signal on which the correction processing has been performed, and second correction processor 132 outputs, to mixing processor 150, the second audio signal on which the correction processing has not been performed.

When the correction processing is performed on the second audio signal, first correction processor 131 outputs, to mixing processor 150, the first audio signal on which the correction processing has not been performed, and second correction processor 132 outputs, to mixing processor 150, the second audio signal on which the correction processing has been performed.

Mixing processor 150 is a processor which mixes at least one of the first audio signal or the second audio signal on which the correction processing has been performed by the correction processor and outputs the at least one thereof to loudspeakers 1 to 5 serving as a plurality of output channels.

More specifically, when the correction processing is performed on the first audio signal and the second audio signal, mixing processor 150 mixes the first audio signal and the second audio signal on which the correction processing has been performed, and outputs them. When the correction processing is performed on the first audio signal, mixing processor 150 mixes the first audio signal on which the correction processing has been performed and the second audio signal on which the correction processing has not been performed, and outputs them. When the correction processing is performed on the second audio signal, mixing processor 150 mixes the first audio signal on which the correction processing has not been performed and the second audio signal on which the correction processing has been performed, and outputs them.

When as another example, instead of loudspeakers 1 to 5 arranged around listener L, headphones arranged in the vicinity of the auricles of listener L are used as the output channels, mixing processor 150 performs the following processing. In this case, when mixing processor 150 mixes the first audio signal and the second audio signal, mixing processor 150 performs processing for convoluting a head-related transfer function to produce an output.

When as described above, the headphones are used instead of loudspeakers 1 to 5, for example, the processing for convoluting the head-related transfer function for the directions of loudspeakers virtually arranged around listener L is performed, and thus the ambient sound is output to be distributed in first range R1. For example, the processing for convoluting the head-related transfer function is performed, and thus the target sound is output to be localized in a predetermined position.

Operation Example 1

Figure 3:
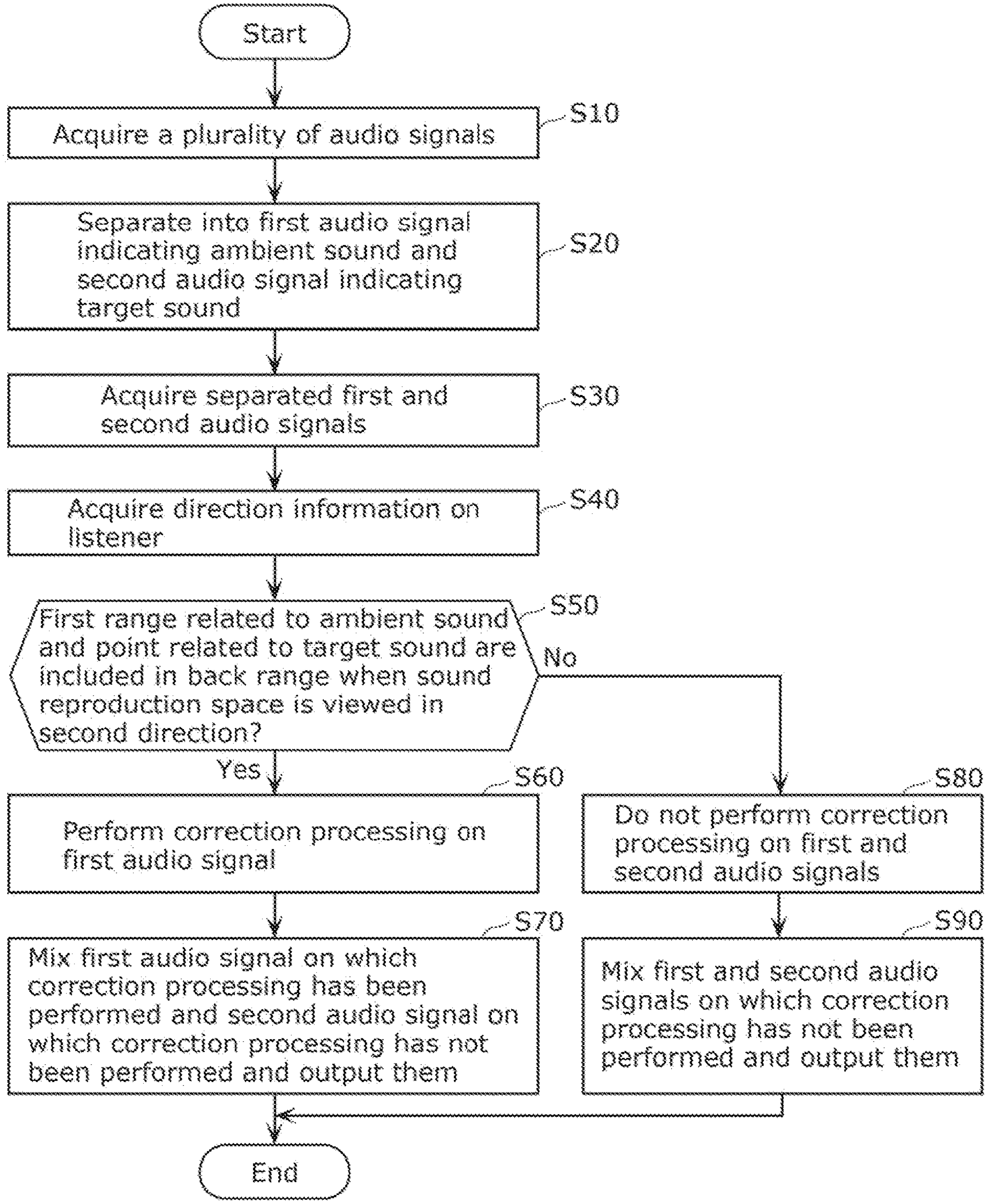
FIG. 3 is a flowchart of Operation Example 1 of the acoustic reproduction device according to the embodiment.

Operation Examples 1 and 2 in an acoustic reproduction method performed by acoustic reproduction device 100 will be described below, Operation Example 1 will first be described. FIG. 3 is a flowchart of Operation Example 1 of acoustic reproduction device 100 according to the present embodiment.

Signal processor 110 acquires a plurality of audio signals (S10).

Signal processor 110 separates the audio signals acquired by signal processor 110 into the first audio signal and the second audio signal (S20).

First decoder 121 and second decoder 122 respectively acquires the first audio signal and the second audio signal separated by signal processor 110 (S30). Step S30 is a signal acquisition step. More specifically, first decoder 121 acquires the first audio signal, and second decoder 122 acquires the second audio signal, Furthermore, first decoder 121 decodes the first audio signal, and second decoder 122 decodes the second audio signal.

Here, information acquirer 140 acquires the direction information output by head sensor 300 (S40). Step S40 is an information acquisition step. Information acquirer 140 acquires: the first information which is included in the first audio signal indicating the ambient sound and indicates first range R1; and the second information which is included in the second audio signal indicating the target sound and indicates point P in first direction D1.

Furthermore, information acquirer 140 outputs, to first correction processor 131 and second correction processor 132 (that is, the correction processor), the direction information, the first information, and the second information which are acquired.

The correction processor acquires the first audio signal, the second audio signal, the direction information, the first information, and the second information. Here, the correction processor determines, based on the direction information acquired, whether the predetermined condition is satisfied. Specifically, the correction processor determines, based on the direction information acquired, whether first range R1 and point P are included in back range RB (S50). More specifically, the correction processor determines, based on the direction information, the first information, and the second information acquired, whether first range R1 and point P are included in back range RB when the sound reproduction space is viewed in the second direction. The correction processor is also said to determine the degree of dispersion of first range R1, point P, and back range RB.

Here, the determination made by the correction processor and back range RB will be described with reference to FIGS. 4 to 7.

Figure 4:
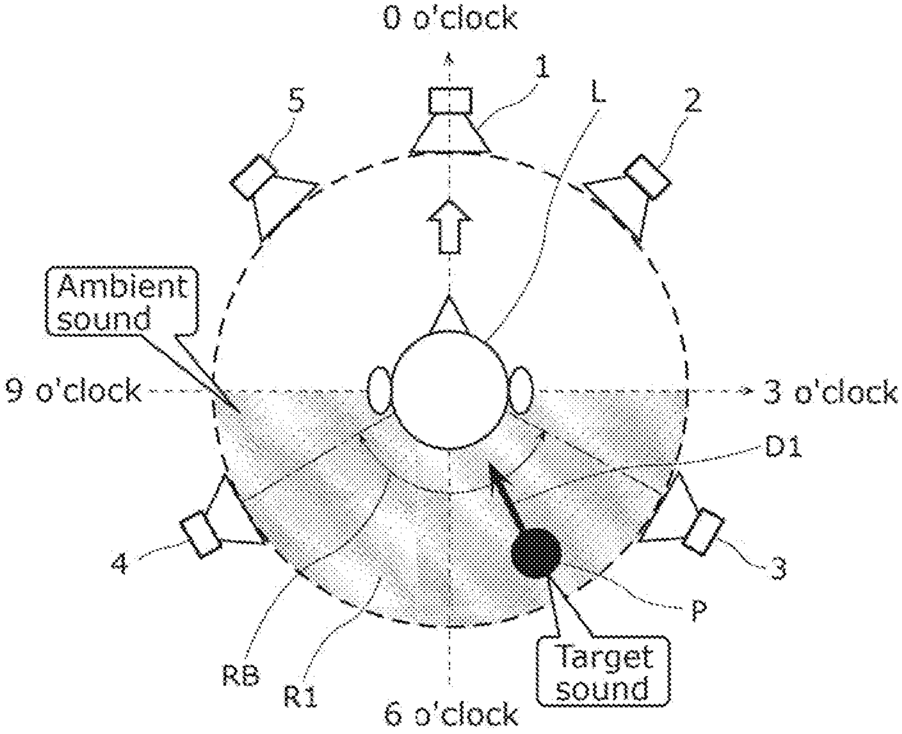
FIG. 4 is a schematic view for illustrating an example of a determination made by a correction processor in the embodiment.
Figure 5:
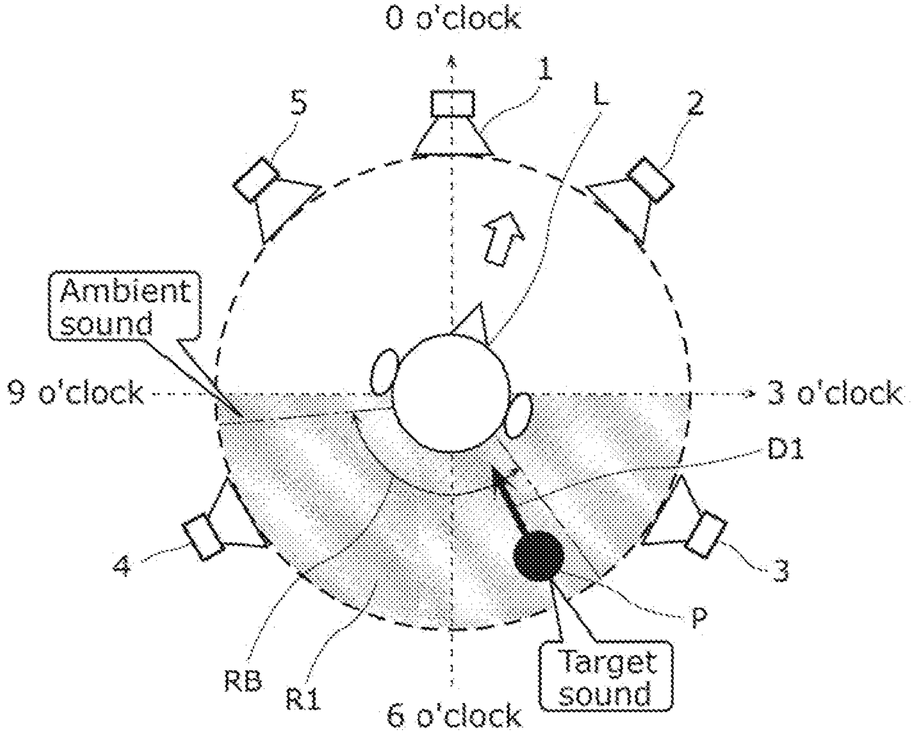
FIG. 5 is a schematic view for illustrating another example of the determination made by the correction processor in the embodiment.
Figure 6:
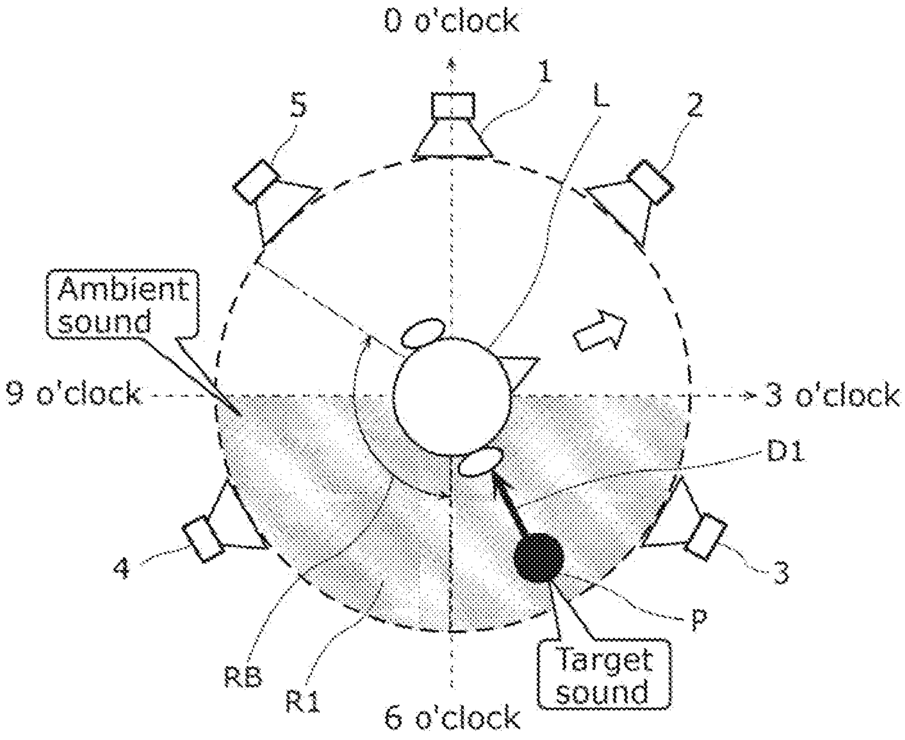
FIG. 6 is a schematic view for illustrating another example of the determination made by the correction processor in the embodiment.

FIGS. 4 to 7 are schematic views for illustrating an example of the determination made by the correction processor in the present embodiment. More specifically, in FIGS. 4, 5, and 7, the correction processor determines that first range R1 and point P are included in back range RB, and in FIG. 6, the correction processor determines that first range R1 and point P are not included in back range RB. FIGS. 4, 5, and 6 sequentially show how the direction in which the head of listener L faces is changed clockwise. FIGS. 4 to 7 each are diagrams when the sound reproduction space is viewed in the second direction (direction toward listener L from above listener L). In FIG. 4 which shows an example, the ambient sound is output, for example, with loudspeakers 2 to 5 by adjusting the output levels thereof (LVa2, LVa3, LVa4, and LVa5) so as to be distributed in first range R1. The target sound is output, for example, with loudspeakers 3 and 4 by adjusting the output levels thereof (LVo3 and LVo4) through panning so as to be localized in a predetermined position.

As shown in FIGS. 4 to 7, back range RB is a back range relative to a front range in the direction in which the head of listener L faces. In other words, back range RB is a back range of listener L. Back range RB is a range which is centered in a direction directly opposite to the direction in which the head of listener L faces and extends behind listener L. As an example, a case where the direction in which the head of listener L faces is the 0 o'clock direction will be described.

Figure 7:
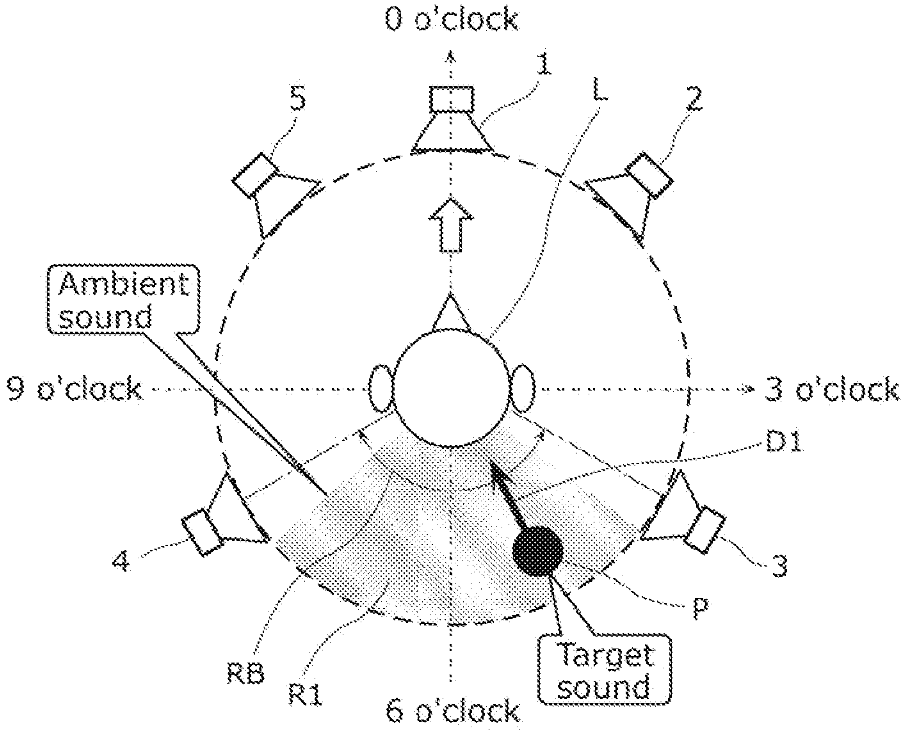
FIG. 7 is a schematic view for illustrating another example of the determination made by the correction processor in the embodiment.

As indicated by two chain double-dashed lines in FIGS. 4 and 7, back range RB is a range (that is, an angular range of) 120° from the 4 o'clock direction to the 8 o'clock direction which is centered in the 6 o'clock direction directly opposite to the 0 o'clock direction. However, back range RB is not limited to this range. Back range RB is determined based on the direction information acquired by information acquirer 140. As shown in FIGS. 4 to 6, as the direction in which the head of listener L faces is changed, back range RB is changed. However, as described above, first range R1, point P, and first direction D1 are not changed.

As described above, the correction processor determines whether first range R1 and point P are included in back range RB which is determined based on the direction information and is the back range of listener L. A specific positional relationship between first range R1, first direction D1, and back range RB will be described below.

A case (yes in step S50) where the correction processor determines that first range R1 and point P are included in back range RB will first be described with reference to FIGS. 4, 5 and 7.

When as shown in FIG. 4, the direction in which the head of listener L faces is the 0 o'clock direction, back range RB is a range from the 4 o'clock direction to the 8 o'clock direction. First range R1 related to the ambient sound is a range from the 3 o'clock direction to the 9 o'clock direction, and point P related to the target sound is a point in the 5 o'clock direction which is an example of first direction D1. In other words, point P is included in first range R1, and a part of first range R1 is included in back range RB. More specifically, point P related to the target sound is included in first range R1 related to the ambient sound, and both point P and the part of first range R1 are included in back range RB. Here, the correction processor determines that both first range R1 and point P are included in back range RB.

Furthermore, the same is true for a case where as shown in FIG. 5, the direction in which the head of listener L faces is moved clockwise relative to the case shown in FIG. 4.

In FIG. 7, the direction in which the head of listener L faces is the 0 o'clock direction as in FIG. 4, and back range RB is the range from the 4 o'clock direction to the 8 o'clock direction. Here, an example is shown where first range R1 related to the ambient sound is narrower than the range from the 4 o'clock direction to the 8 o'clock direction. Even in this case, point P is included in first range R1 and all first range R1 is included in back range RB. More specifically, point P related to the target sound is included in first range R1 related to the ambient sound, and both point P and all first range R1 are included in back range RB. Here, the correction processor determines that both first range R1 and point P are included in back range RB.

In the cases shown in FIGS. 4, 5, and 7, the correction processor performs the correction processing on at least one of the first audio signal or the second audio signal. Here, as an example, the correction processor performs the correction processing on the first audio signal of the first audio signal and the second audio signal (S60). In other words, the correction processor does not perform the correction processing on the second audio signal. More specifically, first correction processor 131 performs the correction processing on the first audio signal, and second correction processor 132 does not perform the correction processing on the second audio signal. Step S60 is a correction processing step.

Here, the correction processor performs the correction processing such that first range R1 does not overlap point P when the sound reproduction space is viewed in a predetermined direction. More specifically, the correction processor performs the correction processing such that first range R1 does not overlap first direction D1 and point P when the sound reproduction space is viewed in the predetermined direction. The predetermined direction is, for example, the second direction described previously.

In other words, when the sound reproduction space as shown in FIGS. 2 and 4 to 7 is viewed in the second direction toward listener L from above listener L, the correction processor performs the correction processing such that first range R1 does not overlap first direction D1 and point P.

For example, the correction processor performs the correction processing such that at least one of first range R1 where the sound image of the ambient sound is localized or the position of point P where the sound image of the target sound is localized is moved. In this way, first range R1 does not overlap first direction D1 and point P. Here, the meaning of "first range R1 does not overlap first direction D1 and point P" is the same as the meaning of "first direction D1 and point P are not included in first range R1".

First correction processor 131 outputs, to mixing processor 150, the first audio signal on which the correction processing has been performed, and second correction processor 132 outputs, to mixing processor 150, the second audio signal on which the correction processing has not been performed.

Mixing processor 150 mixes the first audio signal on which the correction processing has been performed by first correction processor 131 and the second audio signal on which the correction processing has not been performed by second correction processor 132, and outputs them to the output channels (S70). As described above, the output channels refer to loudspeakers 1 to 5. Step S70 is a mixing processing step.

Then, a case (no in step S50) where the correction processor determines that first range R1 and first direction D1 are not included in back range RB will be described with reference to FIG. 6.

When as shown in FIG. 6, the direction in which the head of listener L faces is a 2 o'clock direction, back range RB is a range from the 6 o'clock direction to a 10 o'clock direction. First range R1, point P, and first direction D1 are not changed from FIGS. 4 and 5. Here, the correction processor determines that point P is not included in back range RB. More specifically, the correction processor determines that at least one of first range R1 or point P is not included in back range RB.

In the case shown in FIG. 6, the correction processor does not perform the correction processing on the first audio signal and the second audio signal (S80). First correction processor 131 outputs, to mixing processor 150, the first audio signal on which the correction processing has not been performed, and second correction processor 132 outputs, to mixing processor 150, the second audio signal on which the correction processing has not been performed.

Mixing processor 150 mixes the first audio signal and the second audio signal on which the correction processing has not been performed by the correction processor, and outputs them to loudspeakers 1 to 5 serving as the output channels (S90).

As described above, in the present embodiment, the acoustic reproduction method includes the signal acquisition step, the information acquisition step, the correction processing step, and the mixing processing step. The signal acquisition step is a step of acquiring the first audio signal corresponding to the ambient sound that arrives at listener L from first range R1 which is the range of the first angle in the sound reproduction space and the second audio signal corresponding to the target sound that arrives at listener L from point P in first direction D1 in the sound reproduction space, The information acquisition step is a step of acquiring the direction information about the direction in which the head of listener L faces, The correction processing step is a step of performing, when back range RB relative to a front range in the direction in which the head of listener L faces is determined to include first range R1 and point P based on the direction information acquired, the correction processing. More specifically, the correction processing step is a step of performing the correction processing on at least one of the first audio signal acquired or the second audio signal acquired such that first range R1 does not overlap point P when the sound reproduction space is viewed in the predetermined direction. The mixing processing step is a step of mixing at least one of the first audio signal on which the correction processing has been performed or the second audio signal on which the correction processing has been performed and outputting, to the output channels, the at least one of the first audio signal or the second audio signal which has undergone the mixing.

In this way, when first range R1 and point P are included in back range RB, the correction processing is performed such that first range R1 does not overlap point P. Hence, burying of the target sound whose sound image is localized at point P in the ambient sound whose sound image is localized in first range R1 is suppressed, and thus listener L easily hears the target sound which arrives at listener L from behind listener L. In other words, the acoustic reproduction method is realized which can enhance the level of perception of a sound (in the present embodiment, the target sound) arriving from behind listener L.

First range R1 is a back range relative to the reference direction which is determined by the positions of five loudspeakers 1 to 5.

In this way, even when the ambient sound arrives at listener L from the back range relative to the reference direction, listener L more easily hears the target sound which arrives at listener L from behind listener L.

The predetermined direction is the second direction toward listener L from above listener L.

In this way, when the sound reproduction space is viewed from above listener L, first range R1 does not overlap point P. Consequently, listener L easily hears the target sound which arrives at listener L from behind listener L. In other words, the acoustic reproduction method is realized which can enhance the level of perception of the target sound arriving from behind listener L.

For example, a program according to the present embodiment may be a program for causing a computer to execute the acoustic reproduction method described above.

In this way, the computer can execute the acoustic reproduction method described above according to the program.

Here, the first to fourth examples of the correction processing performed by the correction processor in Operation Example 1 will be described.

First Example

In the first example, the correction processing is performed on the first audio signal, and thus first range R1 includes second range R2 and third range R3. In other words, the correction processing is performed, and thus first range R1 is divided into second range R2 and third range R3. The ambient sound arrives at listener L from second range R2 and third range R3.

Figure 8:
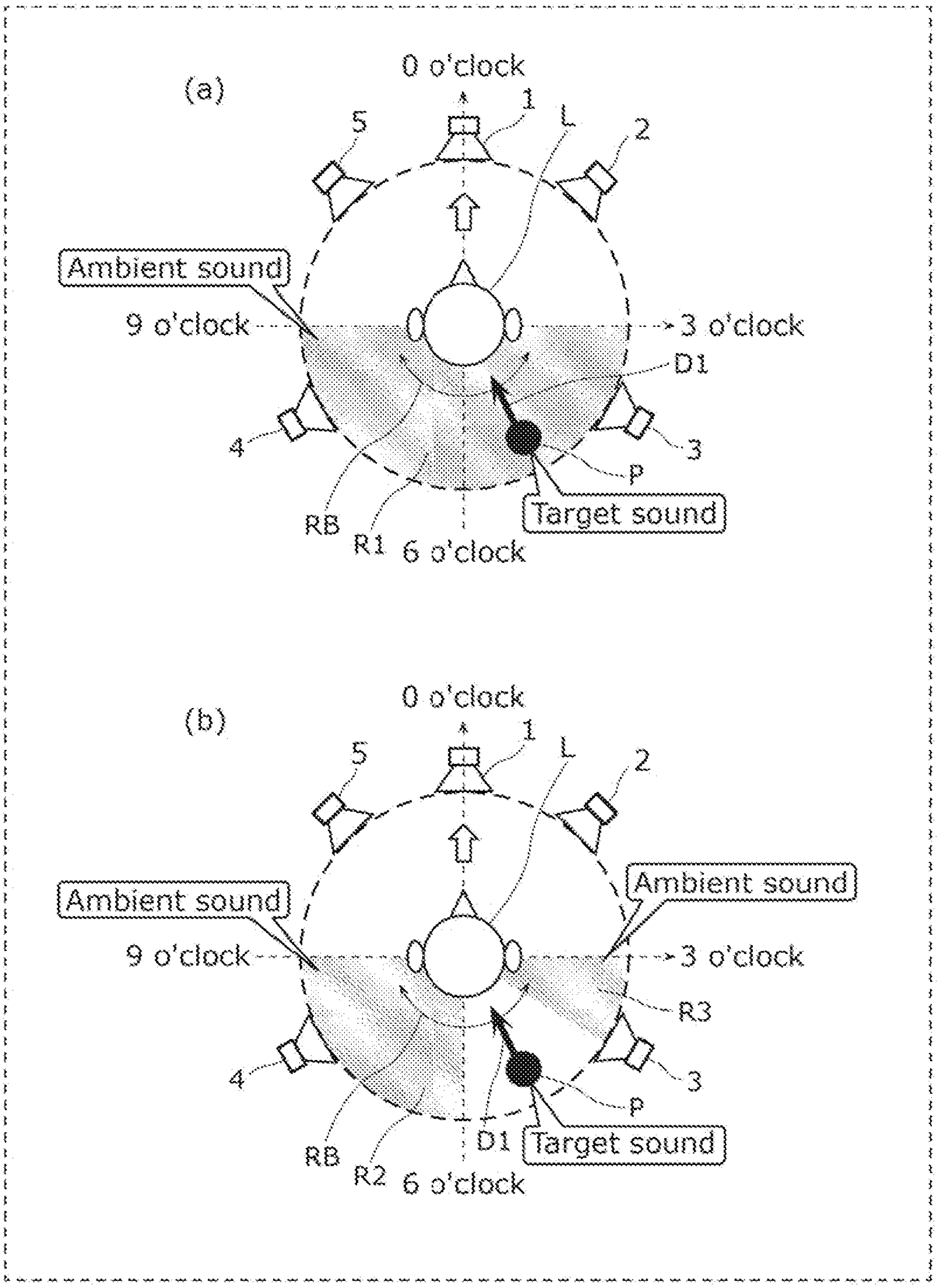
FIG. 8 is a diagram illustrating an example of correction processing in the first example of Operation Example 1 in the embodiment.

FIG. 8 is a diagram illustrating an example of the correction processing in the first example of Operation Example 1 in the present embodiment.

(a) in FIG. 8 is a schematic view showing an example of the first audio signal before the correction processing in the first example of the present embodiment is performed, and corresponds to FIG. 4. Here, in step S60, the correction processing in the first example is performed on the first audio signal.

(b) in FIG. 8 is a schematic view showing an example of the first audio signal after the correction processing in the first example of the present embodiment is performed. In FIG. 8, two chain dashed lines related to back range RB are omitted, and the same is true for FIGS. 9 to 11 which will be described later.

The correction processing in the first example will be described in detail below.

First range R1 indicated by the first audio signal on which the correction processing has been performed includes second range R2 and third range R3.

Second range R2 is the range of a second angle when the sound reproduction space is viewed in the second direction. Although an example of second range R2 is a range (that is, an angular range of) 90° from the 6 o'clock direction to the 9 o'clock direction, second range R2 is not limited to this example.

Third range R3 is the range of a third angle when the sound reproduction space is viewed in the second direction. The third angle is different from the second angle described above. Although an example of third range R3 is a range (that is, an angular range of) 30° from the 3 o'clock direction to the 4 o'clock direction, third range R3 is not limited to this example. Third range R3 is a range which is different from second range R2, and does not overlap second range R2. In other words, second range R2 and third range R3 are divided from each other.

Here, the ambient sound arrives at listener L from all regions in second range R2 and third range R3. In (b) in FIG. 8, the ambient sound is a sound which arrives at listener L from the entire regions that are dotted to indicate second range R2 and third range R3. In other words, the ambient sound is a sound whose sound image is localized in the entire dotted regions in (b) in FIG. 8.

As described above, first range R1 before the correction processing is performed is the range from the 3 o'clock direction to the 9 o'clock direction. Second range R2 is the range from the 6 o'clock direction to the 9 o'clock direction, and third range R3 is the range from the 3 o'clock direction to the 4 o'clock direction. Hence, here, second range R2 and third range R3 are ranges which are narrower than first range R1 before the correction processing is performed, that is, are ranges which fall within first range R1 before the correction processing is performed.

Point P indicating the target sound is a point in the 5 o'clock direction. Hence, second range R2 and third range R3 are provided to sandwich point P in first direction D1. Furthermore, when the sound reproduction space is viewed in the second direction, second range R2 does not overlap point P, and third range R3 does not overlap point P. More specifically, when the sound reproduction space is viewed in the second direction, second range R2 does not overlap point P and first direction D1, and third range R3 does not overlap point P and first direction D1.

The correction processing will be described in further detail. In (b) in FIG. 8, the ambient sound is corrected and output, for example, with loudspeakers 2 and 3 by adjusting the output levels thereof (LVa21 and LVa31) so as to be distributed in third range R3. The ambient sound is further corrected and output, for example, with loudspeakers 4 and 5 by adjusting the output levels thereof (LVa41 and LVa51) so as to be distributed in second range R2. In other words, the ambient sound is output with loudspeakers 3 and 4 at the output levels thereof which have been adjusted, and thus the level of the ambient sound which is distributed in the range sandwiched between third range R3 and second range R2 is adjusted to be reduced.

For example, relational formulae indicating a relationship between the angle (θ10) of the direction of the target sound to be localized, the angles (θ13 and θ14) of directions in which loudspeakers 3 and 4 are arranged, the output levels (LVa2, LVa3, LVa4, and LVa5) before the correction, the output levels (LVa21, LVa31, LVa41, and LVa51) after the correction, and a predetermined output level adjustment amount g0 are assumed to be formulae (1), (2), (3), (4), (5), and (6).

$$g1 = g0 \times |(\theta 13 - \theta 10)| / |(\theta 13 - \theta 14)| \quad (1)$$

$$LVa21 = LVa2 \times (1 + g1) \quad (2)$$

$$LVa31 = LVa3 \times (-g1) \quad (3)$$

$$g2 = g0 \times |(\theta 14 - \theta 10)| / |(\theta 13 - \theta 14)| \quad (4)$$

$$LVa41 = LVa4 \times (-g2) \quad (5)$$

$$LVa51 = LVa5 \times (1 + g2) \quad (6)$$

The output levels may be adjusted by formulae (1), (2), (3), (4), (5), and (6). This is an example where the total sum of the output levels from loudspeakers 1 to 5 is kept constant and the output levels are adjusted.

Alternatively, when headphones are used instead of loudspeakers 1 to 5, the following processing is performed. For the ambient sound, for example, instead of convoluting, based on an angle indicating the direction of the target sound to be localized, the head-related transfer function for the 4 o'clock direction in which loudspeaker 3 is arranged, processing for convoluting the head-related transfer function for a direction obtained by shifting the direction a predetermined angle counterclockwise is performed, and instead of convoluting the head-related transfer function for the 8 o'clock direction in which loudspeaker 4 is arranged, processing for convoluting the head-related transfer function for a direction obtained by shifting the direction a predetermined angle clockwise is performed, with the result that the angle of the head-related transfer function to be convoluted into the ambient sound is adjusted such that the ambient sound is distributed in third range R3 and second range R2 related to the ambient sound. In other words, here, the correction processing is processing for adjusting an angle corresponding to the head-related transfer function which is convoluted into the first audio signal related to the ambient sound.

For example, relational formulae indicating a relationship between the angle (θ10) of the direction of the target sound to be localized, the angles (θ13 and θ14) of the directions in which loudspeakers 3 and 4 are arranged, the angles (θ23 and θ24) of directions after the correction, angle adjustment amounts Δ3 and Δ4, and a predetermined coefficient α are assumed to be formulae (7), (8), (9), and (10). The predetermined coefficient α is a coefficient by which a difference between the angle of the direction of the target sound and the angles of the directions in which loudspeakers 3 and 4 are arranged is multiplied.

$$43 = \alpha \times (\theta 13 - \theta 10) \quad (7)$$

$$\theta 23 = \theta 13 + \Delta 3 \quad (8)$$

$$\Delta 4 = \alpha \times (\theta 14 - \theta 10) \quad (9)$$

$$\theta 24 = \theta 14 + \Delta 4 \quad (10)$$

Based on the angles of the directions which are corrected by formulae (7), (8), (9), and (10), the direction of the head-related transfer function which is convoluted may be adjusted.

The correction processing is performed in this way, and thus the range in which the sound image of the ambient sound is localized is corrected from first range R1 to second range R2 and third range R3.

Furthermore, processing for which the correction processor performs the correction processing will be described below.

Here, first correction processor 131 performs the correction processing on the first audio signal, and second correction processor 132 does not perform the correction processing on the second audio signal. First correction processor 131 performs processing for convoluting the head-related transfer function into the first audio signal such that first range R1 includes second range R2 and third range R3, that is, first range R1 is divided into second range R2 and third range R3. In other words, first correction processor 131 controls the frequency characteristics of the first audio signal to perform the correction processing described above.

Therefore, in the first example, first range R1 indicated by the first audio signal on which the correction processing has been performed includes: second range R2 that is the range of the second angle; and third range R3 that is the range of the third angle different from the second angle. The ambient sound arrives at listener L from second range R2 and third range R3. When the sound reproduction space is viewed in the second direction, second range R2 does not overlap point P, and third range R3 does not overlap point P.

In this way, the ambient sound arrives at listener L from second range R2 and third range R3, that is, two ranges. Hence, it is possible to enhance the level of perception of the target sound which arrives from behind listener L, and the acoustic reproduction method is realized in which listener L can hear the expansive ambient sound.

As an example, the correction processing is processing for adjusting the output level of at least one of the first audio signal acquired or the second audio signal acquired.

As an example, the correction processing is processing for adjusting the output level of at least one of the first audio signal acquired or the second audio signal acquired. More specifically, the correction processing is processing for adjusting the output level in each of a plurality of output channels which outputs the at least one thereof. In this case, in the correction processing, the output levels of the first audio signal and the second audio signal are adjusted in each of a plurality of output channels which outputs the first audio signal and the second audio signal.

As an example, the correction processing is processing for adjusting, based on the output level of the first audio signal corresponding to the ambient sound arriving at listener L from first range R1, the output level in each of a plurality of output channels which outputs the second audio signal. In this case, based on the output level of the first audio signal before the correction processing is performed, the output levels of the second audio signals output from a plurality of output channels are determined.

As an example, the correction processing is processing for adjusting an angle corresponding to the head-related transfer function which is convoluted into at least one of the first audio signal acquired or the second audio signal acquired.

As an example, the correction processing is processing for adjusting, based on an angle corresponding to the head-related transfer function which is convoluted into the first audio signal such that the ambient sound indicated by the first audio signal arrives at the listener from first range R1, an angle corresponding to the head-related transfer function which is convoluted into the second audio signal. In this case, based on the angle corresponding to the head-related transfer function related to the first audio signal before the correction processing is performed, angles corresponding to the head-related transfer function related to the second audio signals output from a plurality of output channels are determined.

In these types of correction processing described above, listener L easily hears the target sound which arrives at listener L from behind listener L. In other words, the acoustic reproduction method is realized which can enhance the level of perception of a sound arriving from behind listener L.

The processing for performing the correction processing described above is an example. As another example, the correction processor may perform the correction processing on at least one of the first audio signal or the second audio signal such that the loudspeakers for outputting the ambient sound and the target sound are changed. The correction processor may perform the correction processing on the first audio signal such that the volume of a part of the ambient sound is lost. The part of the ambient sound is a sound (ambient sound) whose sound image is localized in a range (for example, a range from the 4 o'clock direction to the 6 o'clock direction) around point P in first range R1.

In this way, the correction processing is performed such that first range R1 includes second range R2 and third range R3, that is, first range R1 is divided into second range R2 and third range R3. Hence, it is possible to enhance the level of perception of the target sound which arrives from behind listener L, and the acoustic reproduction method is realized in which listener L can hear the expansive ambient sound.

Second Example

Although in the first example, first range R1 on which the correction processing has been performed includes second range R2 and third range R3, the present embodiment is not limited to this configuration. In a second example, first range R1 on which the correction processing has been performed includes only second range R2.

Figure 9:
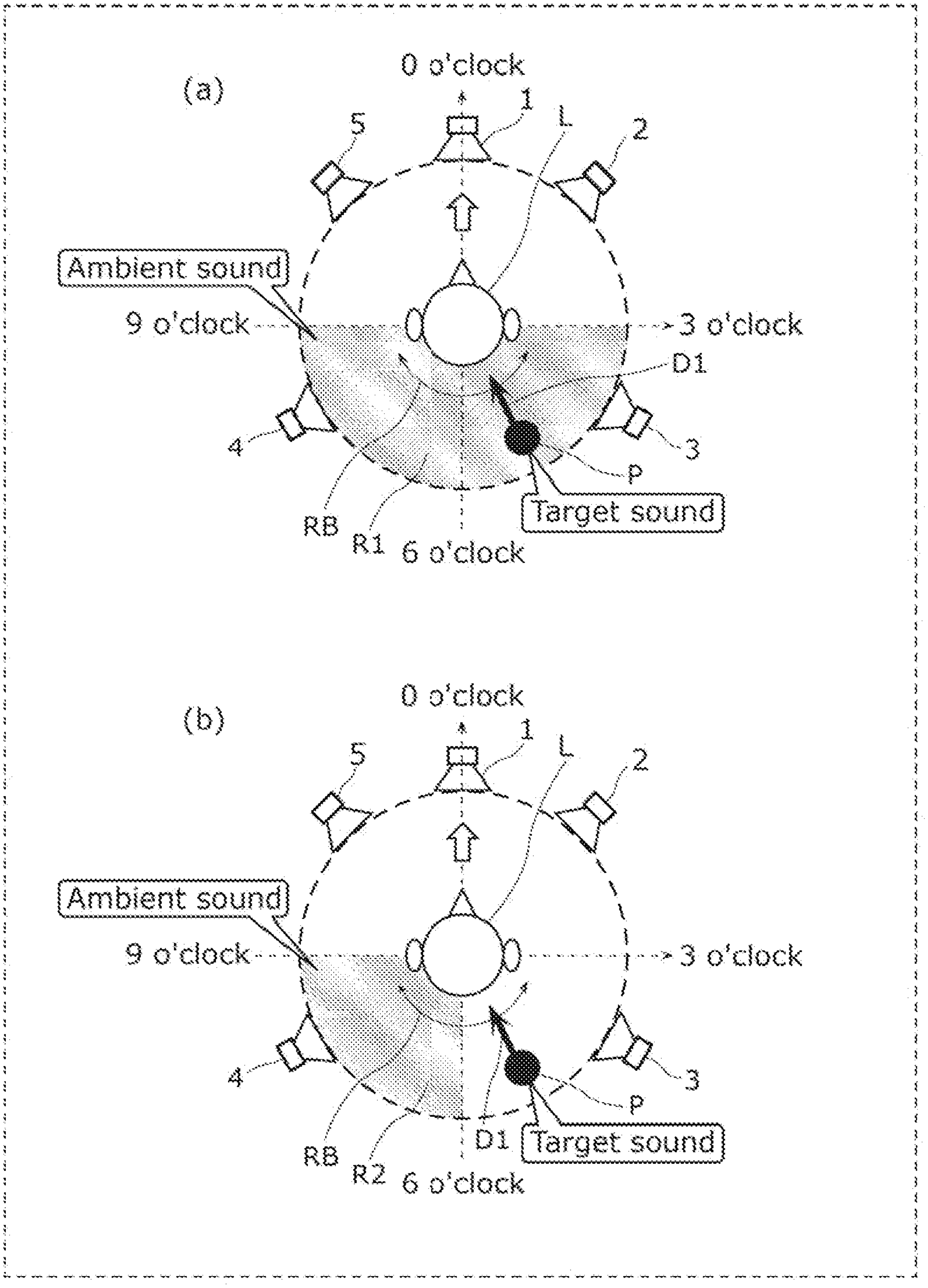
FIG. 9 is a diagram illustrating an example of correction processing in the second example of Operation Example 1 in the embodiment.

FIG. 9 is a diagram illustrating an example of the correction processing in the second example of Operation Example 1 in the present embodiment.

More specifically, (a) in FIG. 9 is a schematic view showing an example of the first audio signal before the correction processing in the second example of the present embodiment is performed, and corresponds to FIG. 4. Here, in step S60, the correction processing in the second example is performed on the first audio signal. (b) in FIG. 9 is a schematic view showing an example of the first audio signal after the correction processing in the second example of the present embodiment is performed.

In the second example, first range R1 on which the correction processing has been performed includes only second range R2 shown in the first example. In other words, point P in first direction D1 does not need to be sandwiched between second range R2 and third range R3.

Even in this case, burying of the target sound whose sound image is localized at point P in the ambient sound whose sound image is localized in first range R1 is suppressed, and thus listener L easily hears the target sound which arrives at listener L from behind listener L. In other words, the acoustic reproduction method is realized which can enhance the level of perception of the target sound arriving from behind listener L.

Third Example

Although in the first example, second range R2 is a range which is narrower than first range R1 before the correction processing is performed, the present embodiment is not limited to this configuration. In a third example, second range R2 is a range which is extended outward of first range R1 before the correction processing is performed.

Figure 10:
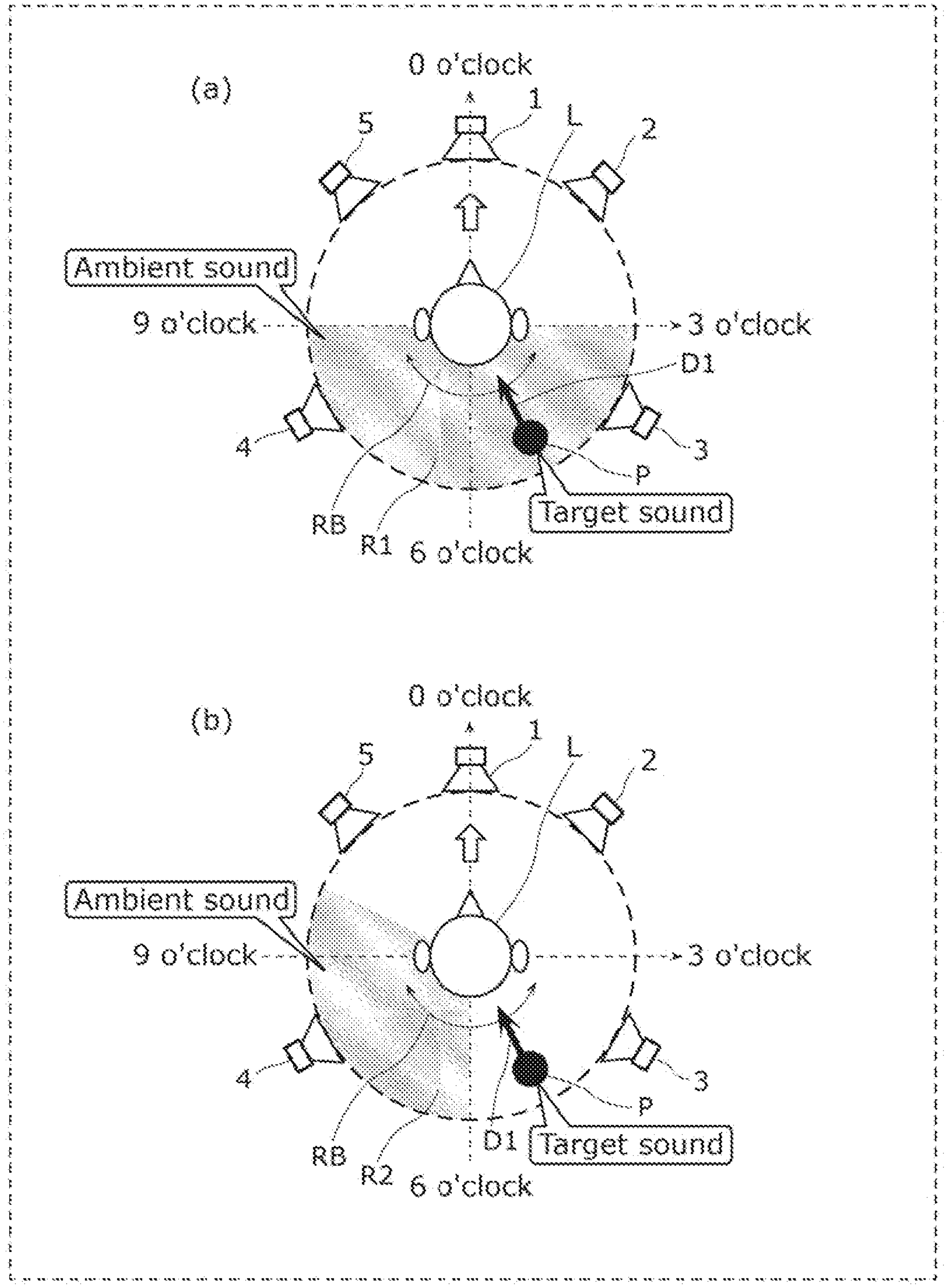
FIG. 10 is a diagram illustrating an example of correction processing in the third example of Operation Example 1 in the embodiment.

FIG. 10 is a diagram illustrating an example of the correction processing in the third example of Operation Example 1 in the present embodiment.

More specifically, (a) in FIG. 10 is a schematic view showing an example of the first audio signal before the correction processing in the third example of the present embodiment is performed, and corresponds to FIG. 4. Here, in step S60, the correction processing in the third example is performed on the first audio signal. (b) in FIG. 10 is a schematic view showing an example of the first audio signal after the correction processing in the third example of the present embodiment is performed.

In the third example, first range R1 on which the correction processing has been performed includes only second range R2.

Second range R2 is a range from the 6 o'clock direction to the 10 o'clock direction. Hence, here, second range R2 is a range which is wider than first range R1 before the correction processing is performed, that is, a range which is extended outward of first range R1 before the correction processing is performed.

Even in this case, burying of the target sound whose sound image is localized at point P in the ambient sound whose sound image is localized in first range R1 is suppressed, and thus listener L easily hears the target sound which arrives at listener L from behind listener L. In other words, the acoustic reproduction method is realized which can enhance the level of perception of the target sound arriving from behind listener L.

Fourth Example

In the description of a fourth example, the fourth example differs from the first to third examples in that point P in first direction D1 is a region having a size.

In this case, the "does not overlap" in step S60 in the description of Operation Example 1 means that "overlapping area is decreased".

Figure 11:
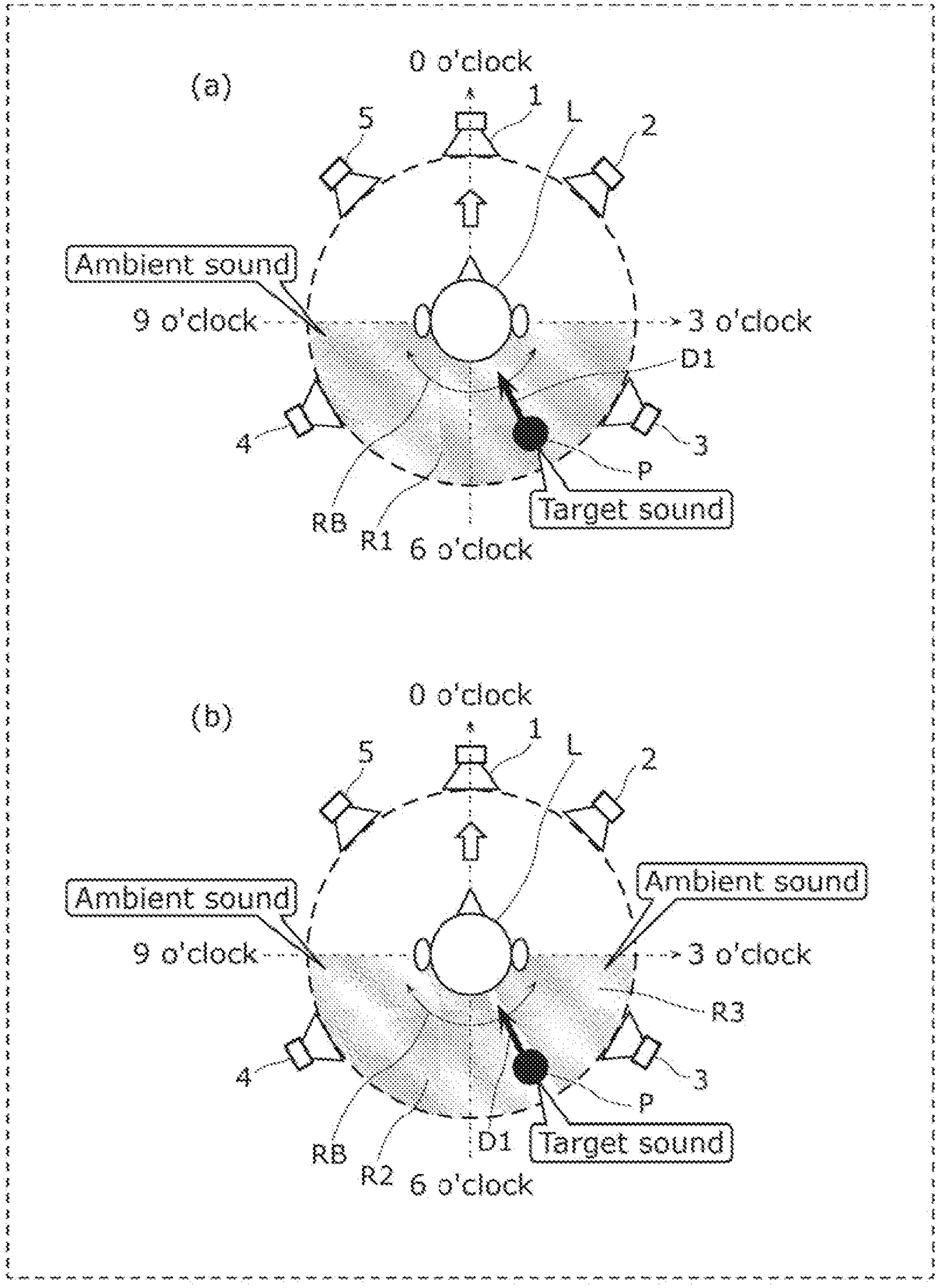
FIG. 11 is a diagram illustrating an example of correction processing in the fourth example of Operation Example 1 in the embodiment.

FIG. 11 is a diagram illustrating an example of the correction processing in the fourth example of Operation Example 1 in the present embodiment. More specifically, (a) in FIG. 11 is a schematic view showing an example of the first audio signal before the correction processing in the fourth example of the present embodiment is performed, and corresponds to FIG. 4. Here, in step S60, the correction processing in the fourth example is performed on the first audio signal. (b) in FIG. 11 is a schematic view showing an example of the first audio signal after the correction processing in the fourth example of the present embodiment is performed.

In the fourth example, first range R1 on which the correction processing has been performed includes second range R2 and third range R3.

In (a) in FIG. 11, when the sound reproduction space is viewed in the second direction, the entire area of point P which is a region having a size overlaps first range R1 in which the sound image of the ambient sound is localized.

In (b) in FIG. 11 where the correction processing has been performed, when the sound reproduction space is viewed in the second direction, a part of the area of point P overlaps second range R2, and another part of the area of point P overlaps third range R3. In other words, in (b) in FIG. 11, the part of the area of point P and the other part thereof respectively overlap second range R2 and third range R3 in which the sound image of the ambient sound is localized.

In other words, in the fourth example, the correction processing is performed, and thus the area where point P at which the sound image of the target sound is localized overlaps the range in which the sound image of the ambient sound is localized is decreased.

Even in this case, burying of the target sound whose sound image is localized at point P in the ambient sound whose sound image is localized in first range R1 is suppressed, and thus listener L easily hears the target sound which arrives at listener L from behind listener L. In other words, the acoustic reproduction method is realized which can enhance the level of perception of the target sound arriving from behind listener L.

The correction processing will be described in further detail.

For example, when an angle indicating a range based on the size of point P indicating the localization of the target sound is assumed to be OP, output level adjustment amounts g1 and g2 used for adjustment of the output level of the ambient sound may be adjusted using formulae (11) and (12) which are relational formulae indicating a relationship between the predetermined output level adjustment amount g0 and the angle OP indicating the range based on the size of point P.

$$g1=g0\times|(\theta 13-(\theta 10-\theta P/2))|/|(\theta 13-\theta 14)| \quad (11)$$

$$g2=g0\times|(\theta 14-(\theta 10+\theta P/2))|/|(\theta 13-\theta 14)| \quad (12)$$

In other words, by formulae (11) and (12), based on the size of θP, the output level adjustment amounts g1 and g2 may be adjusted.

Alternatively, when headphones are used instead of loudspeakers 1 to 5, the following processing is performed using formulae (13) and (14).

$$\Delta 3=\alpha\times(\theta 13-(\theta 10-\theta P/2)) \quad (13)$$

$$\Delta 4=\alpha\times(\theta 14-(\theta 10+\theta P/2)) \quad (14)$$

In other words, by formulae (13) and (14), based on the size of OP, the angle adjustment amounts Δ3 and Δ4 may be adjusted.

Although in the first to fourth examples, the correction processing is not performed on the second audio signal, the present embodiment is not limited to this configuration. In other words, the correction processing may be performed on both the first audio signal and the second audio signal.

Operation Example 2

Figure 12:
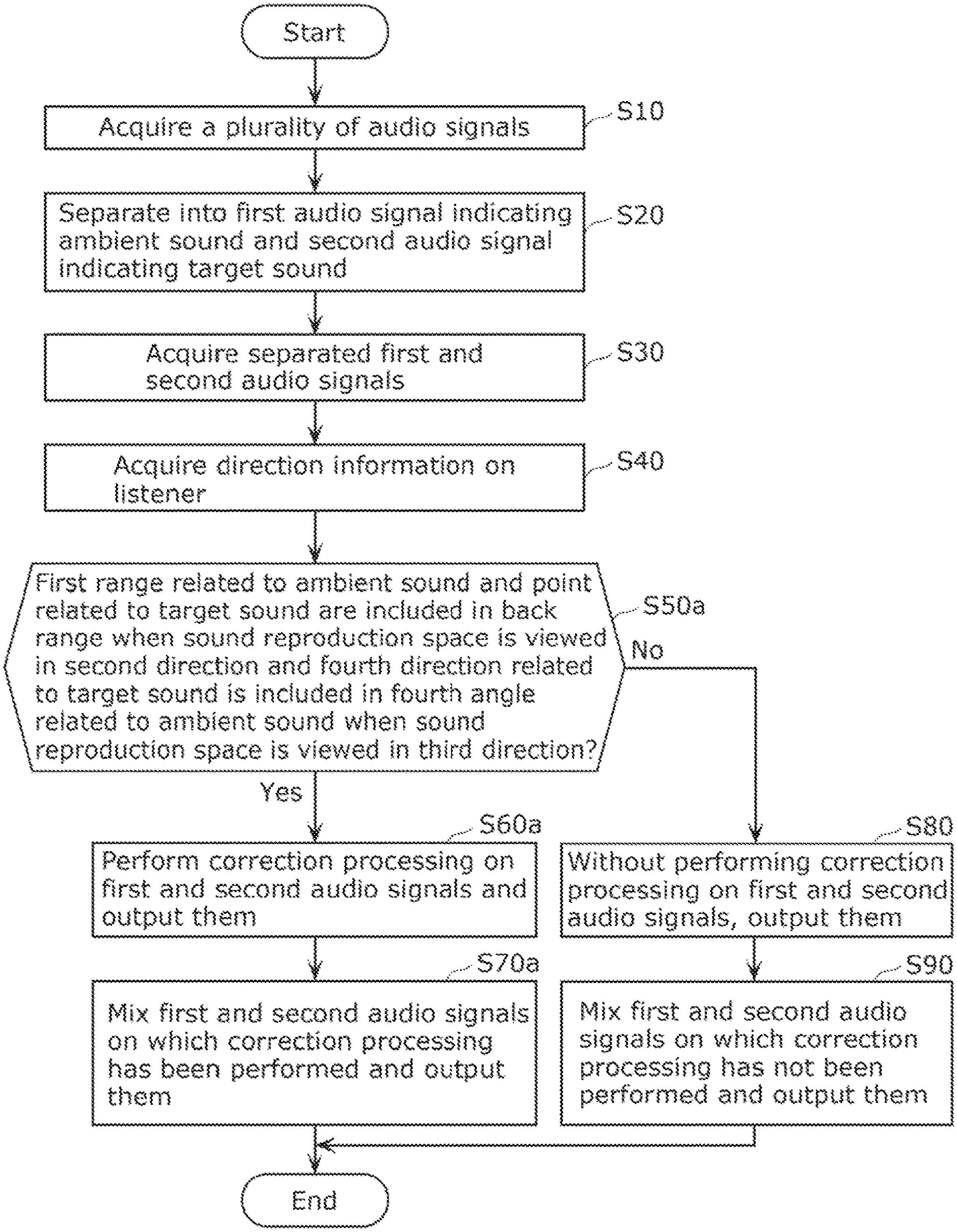
FIG. 12 is a flowchart of Operation Example 2 of the acoustic reproduction device according to the embodiment.

Operation Example 2 in the acoustic reproduction method performed by acoustic reproduction device 100 will then be described. FIG. 12 is a flowchart of Operation Example 2 of acoustic reproduction device 100 according to the present embodiment.

In Operation Example 2, the same processing as in Operation Example 1 is performed in steps S10 to S40. Correction processing in the present example will be further described with reference to FIG. 13.

Figure 13:
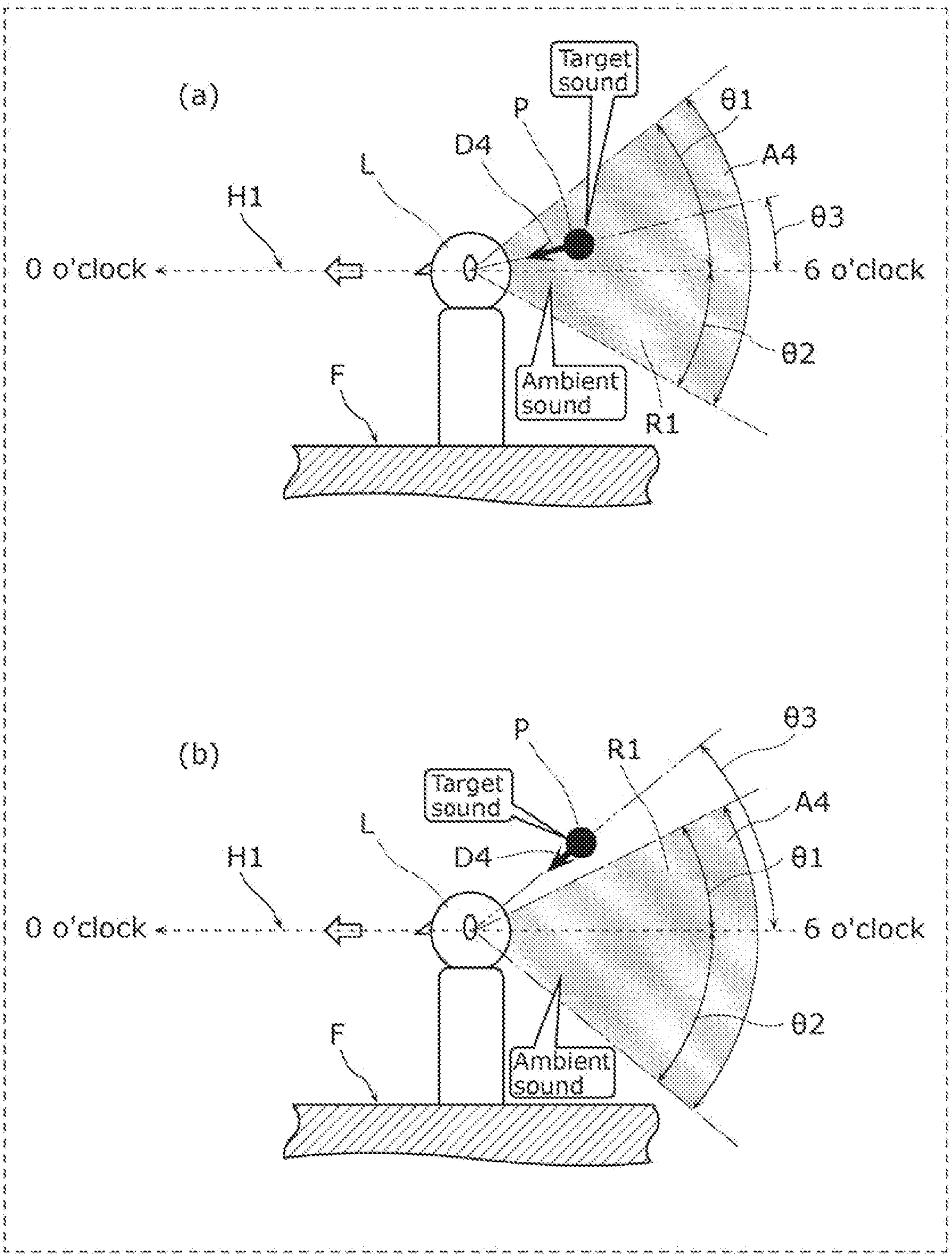
FIG. 13 is a diagram illustrating an example of correction processing in Operation Example 2 of the embodiment.

FIG. 13 is a diagram illustrating an example of the correction processing in Operation Example 2 of the present embodiment. FIG. 13 is a diagram when the sound reproduction space is viewed in a third direction toward listener L from a side of listener L. Although here, the side of listener L is the left side of the face of listener L, the side of listener L may be the right side. More specifically, the third direction is a direction toward listener L from the left side of the face of listener L along a horizontal plane parallel to listener L.

(a) in FIG. 13 is a schematic view showing an example of the first audio signal before the correction processing in Operation Example 2 of the present embodiment is performed, and corresponds to FIG. 7. (b) in FIG. 13 is a schematic view showing an example of the first audio signal after the correction processing in Operation Example 2 of the present embodiment is performed.

Here, the ambient sound and the target sound in Operation Example 2 will be described.

As shown in (a) in FIG. 13, when the sound reproduction space is viewed in the third direction, the ambient sound indicated by the first audio signal acquired by first decoder 121 arrives at listener L from first range R1 which is the range of fourth angle A4 in the sound reproduction space. Likewise, when the sound reproduction space is viewed in the third direction, the target sound indicated by the second audio signal acquired by second decoder 122 arrives at listener L from point P in fourth direction D4 in the sound reproduction space.

Fourth angle A4 related to the ambient sound and fourth direction D4 related to the target sound will be further described.

A horizontal plan at the height of the ear of listener L is assumed to be first horizontal plane H1. Fourth angle A4 is the total of first elevation angle θ1 and depression angle θ2 relative to first horizontal plane H1 and the ear of listener L. Fourth direction D4 is a direction in which the angle between fourth direction D4 and first horizontal plane H1 is θ3. In other words, the elevation angle of fourth direction D4 relative to first horizontal plane H1 and the ear of listener L is θ3 (second elevation angle θ3). Here, first elevation angle θ1>second elevation angle θ3.

The ambient sound is a sound which arrives at listener L from the entire region in first range R1, that is, the entire region (region which is dotted in FIG. 13) in the range of fourth angle A4 when the sound reproduction space is viewed in the third direction. The ambient sound is, for example, a sound whose sound image is localized in the entire region dotted in FIG. 13.

In the present operation example, point P is a point which is located a predetermined distance from listener L in fourth direction D4, and is, for example, a black point shown in FIG. 13.

The target sound is a sound whose sound image is localized at the black point (point P).

Here, Operation Example 2 will be further described with reference to FIG. 12. After the processing in step S40, the correction processor determines, based on the direction information acquired, whether the predetermined condition is satisfied. Specifically, the correction processor determines, based on the direction information acquired, whether first range R1 and point P are included in back range RB and whether fourth direction D4 is included in fourth angle A4 (S50*a*).

In step S50*a*, the correction processor first determines, based on the direction information acquired, whether first range R1 and point P are included in back range RB. More specifically, the correction processor determines, based on the direction information, the first information, and the second information acquired, whether first range R1 and point P are included in back range RB when the sound reproduction space is viewed in the second direction. In other words, the same processing as in step S50 of Operation Example 1 is performed.

Then, in step S50*a*, the correction processor determines, based on the direction information acquired, whether fourth direction D4 is included in fourth angle A4. More specifically, the correction processor determines, based on the direction information, the first information, and the second information acquired, whether fourth direction D4 is included in fourth angle A4 when the sound reproduction space is viewed in the third direction.

Here, the determination made by the correction processor will be described with reference back to (a) in FIG. 13. Since (a) in FIG. 13 corresponds to FIG. 7, first range R1 and point P are determined to be included in back range RB. Furthermore, since first elevation angle θ1>second elevation angle θ3 as described above, in the case shown in (a) in FIG. 13, the correction processor determines that fourth direction D4 is included in fourth angle A4.

In the case shown in (a) in FIG. 13, the correction processor determines that first range R1 and point P are included in back range RB and fourth direction D4 is included in fourth angle A4 (yes in step S50*a*). In this case, the correction processor performs the correction processing on at least one of the first audio signal or the second audio signal, Here, as an example, the correction processor performs the correction processing on the first audio signal and the second audio signal (S60*a*). More specifically, first correction processor 131 performs the correction processing on the first audio signal, and second correction processor 132 performs the correction processing on the second audio signal.

The correction processor performs the correction processing such that first range R1 does not overlap point P when the sound reproduction space is viewed in a predetermined direction. Here, the predetermined direction is, for example, the third direction described above. The correction processor further performs the correction processing such that fourth direction D4 does not overlap first range R1 when the sound reproduction space is viewed in the third direction. In other words, the correction processor performs the correction processing such that first range R1 does not overlap point P and fourth direction D4 when the sound reproduction space is viewed in the third direction.

A result obtained by performing the correction processing with the correction processor is shown in (b) in FIG. 13.

In the present operation example, for example, the correction processor performs the correction processing such that at least one of first range R1 in which the sound image of the ambient sound is localized or the position of point P at which the sound image of the target sound is moved. In this way, first range R1 does not overlap fourth direction D4 and point P. Here, the meaning of "first range R1 does not overlap fourth direction D4 and point P" is the same as the meaning of "first direction D1 and point P are not included in first range R1".

As an example, the correction processor performs the correction processing such that first elevation angle θ1 is decreased, depression angle θ2 is increased, and the second elevation angle θ3 is increased. As shown in (b) in FIG. 13, when the correction processing is performed, first elevation angle θ1<second elevation angle θ3. In other words, the correction processing is performed such that first range R1 is moved further downward and point P is moved further upward. Here, the "downward" is a direction toward floor surface F, and the " " upward" is a direction away from floor surface F. The correction processor performs, as in the first example of Operation Example 1, processing for convoluting the head-related transfer function into the first audio signal and the second audio signal to control first elevation angle θ1, depression angle θ2, and second elevation angle θ3.

First correction processor 131 outputs, to mixing processor 150, the first audio signal on which the correction processing has been performed, and second correction processor 132 outputs, to mixing processor 150, the second audio signal on which the correction processing has not been performed.

Mixing processor 150 mixes the first audio signal on which the correction processing has been performed by first correction processor 131 and the second audio signal on which the correction processing has been performed by second correction processor 132, and outputs them to a plurality of output channels (S70*a*).

When the correction processor determines that first range R1 and point P are not included in back range RB and fourth direction D4 is not included in fourth angle A4 (no in step S50*a*), as in Operation Example 1, the processing in steps S80 and S90 is performed.

As described above, in the present operation example, the predetermined direction is the third direction toward listener L from the side of listener L.

In this way, when the sound reproduction space is viewed from the side of listener L, first range R1 does not overlap point P. Consequently, listener L easily hears the target sound which arrives at listener L from behind listener L. In other words, the acoustic reproduction method is realized which can enhance the level of perception of the target sound arriving from behind listener L.

In the present operation example, when the sound reproduction space is viewed in the third direction, the ambient sound indicated by the first audio signal acquired arrives at listener L from first range R1 which is the range of the fourth angle in the sound reproduction space. When the sound reproduction space is viewed in the third direction, the target sound indicated by the second audio signal acquired arrives at listener L from point P in fourth direction D4 in the sound reproduction space. When the correction processor determines that fourth direction D4 is included in the fourth angle, the correction processor performs the correction processing such that fourth direction D4 does not overlap first range R1 when the sound reproduction space is viewed in the third direction. More specifically, the correction processor performs the correction processing on at least one of the first audio signal acquired or the second audio signal acquired.

In this way, when the sound reproduction space is viewed from the side of listener L, first range R1 does not overlap point P, and first range R1 does not overlap fourth direction D4. Consequently, listener L easily hears the target sound which arrives at listener L from behind listener L. In other words, the acoustic reproduction method is realized which can enhance the level of perception of the target sound arriving from behind listener L.

The correction processing in Operation Example 2 is not limited to the correction processing described above.

For example, the correction processing may be performed such that first range R1 is moved further upward and point P is moved further downward.

For example, the correction processing may be performed such that point P is moved further downward or upward without first range R1 being changed. In this case, first correction processor 131 does not perform the correction processing on the first audio signal, and second correction processor 132 performs the correction processing on the second audio signal. The correction processing may be performed such that first range R1 is moved further downward or upward without point P being changed. In this case, first correction processor 131 performs the correction processing on the first audio signal, and second correction processor 132 does not perform the correction processing on the second audio signal.

Even in this case, when the sound reproduction space is viewed from the side of listener L, first range R1 does not overlap point P, and first range R1 does not overlap fourth direction D4. In other words, the acoustic reproduction method is realized which can enhance the level of perception of the target sound arriving from behind listener L.

Figure 14:
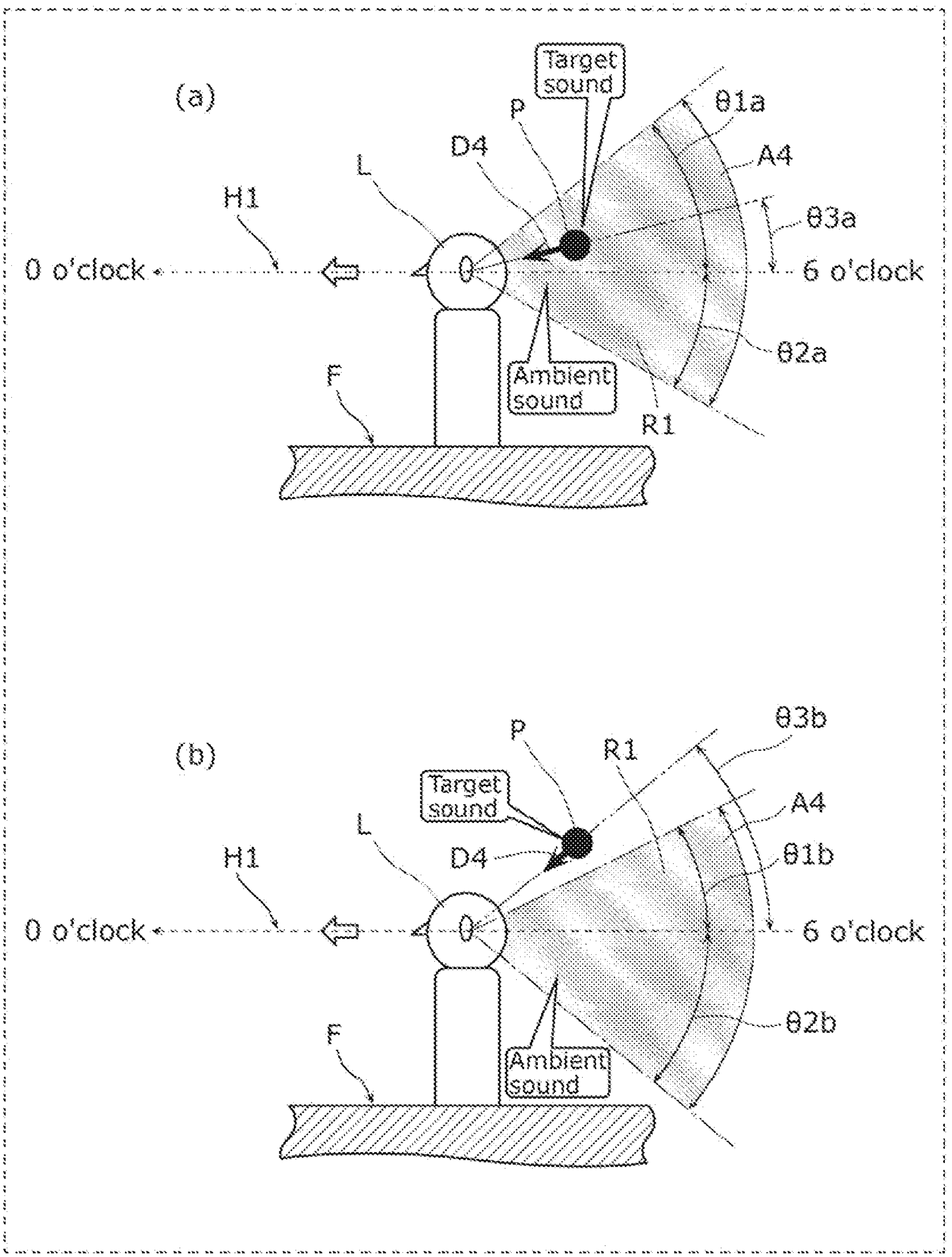
FIG. 14 is a diagram illustrating another example of the correction processing in Operation Example 2 of the embodiment.

As another first example, the correction processor may perform the following processing. This example is, for example, an example where headphones are used instead of loudspeakers 1 to 5. FIG. 14 is a diagram illustrating another example of the correction processing in Operation Example 2 of the present embodiment. For example, the target sound may be corrected such that the head-related transfer function from the elevation direction of second elevation angle θ3a is convoluted.

Here, for description, fourth angle A4 before the correction processing is performed is the total of first elevation angle θ1a and depression angle θ2a relative to first horizontal plane H1 and the ear of listener L, and fourth direction D4 before the correction processing is performed is a direction in which the angle between fourth direction D4 and first horizontal plane H1 is 03a (second elevation angle θ3a). Fourth angle A4 after the correction processing is performed is the total of first elevation angle θ1b and depression angle θ2b relative to first horizontal plane H1 and the ear of listener L, and fourth direction D4 after the correction processing is performed is a direction in which the angle between fourth direction D4 and first horizontal plane H1 is 03b (second elevation angle θ3b).

Furthermore, for example, relational formulae indicating a relationship between angle adjustment amounts A5, 46, and A7 and predetermined coefficient β are assumed to be formulae (15), (16), (17), (18), (19), and (20). The predetermined coefficient β is a coefficient by which a difference between the direction of the target sound and first elevation angle θ1, depression angle θ2a, and second elevation angle θ3a before the correction processing is performed is multiplied.

$$\Delta 5=\beta\times(\theta 1a-\theta 3b) \quad (15)$$

$$\theta 1b=\theta 1a+\Delta 5 \quad (16)$$

$$\Delta 6=\beta\times(\theta 2a-\theta 3b) \quad (17)$$

$$\theta 2b=\theta 2a+\Delta 7 \quad (18)$$

$$\Delta 7=\beta\times(\theta 3a-\theta 3b) \quad (19)$$

$$\theta 3b=\theta 3a+\Delta 7 \quad (20)$$

Based on the angles of the directions which are corrected by formulae (15), (16), (17), (18), (19), and (20), the direction of the head-related transfer function which is convoluted may be adjusted.

Figure 15:
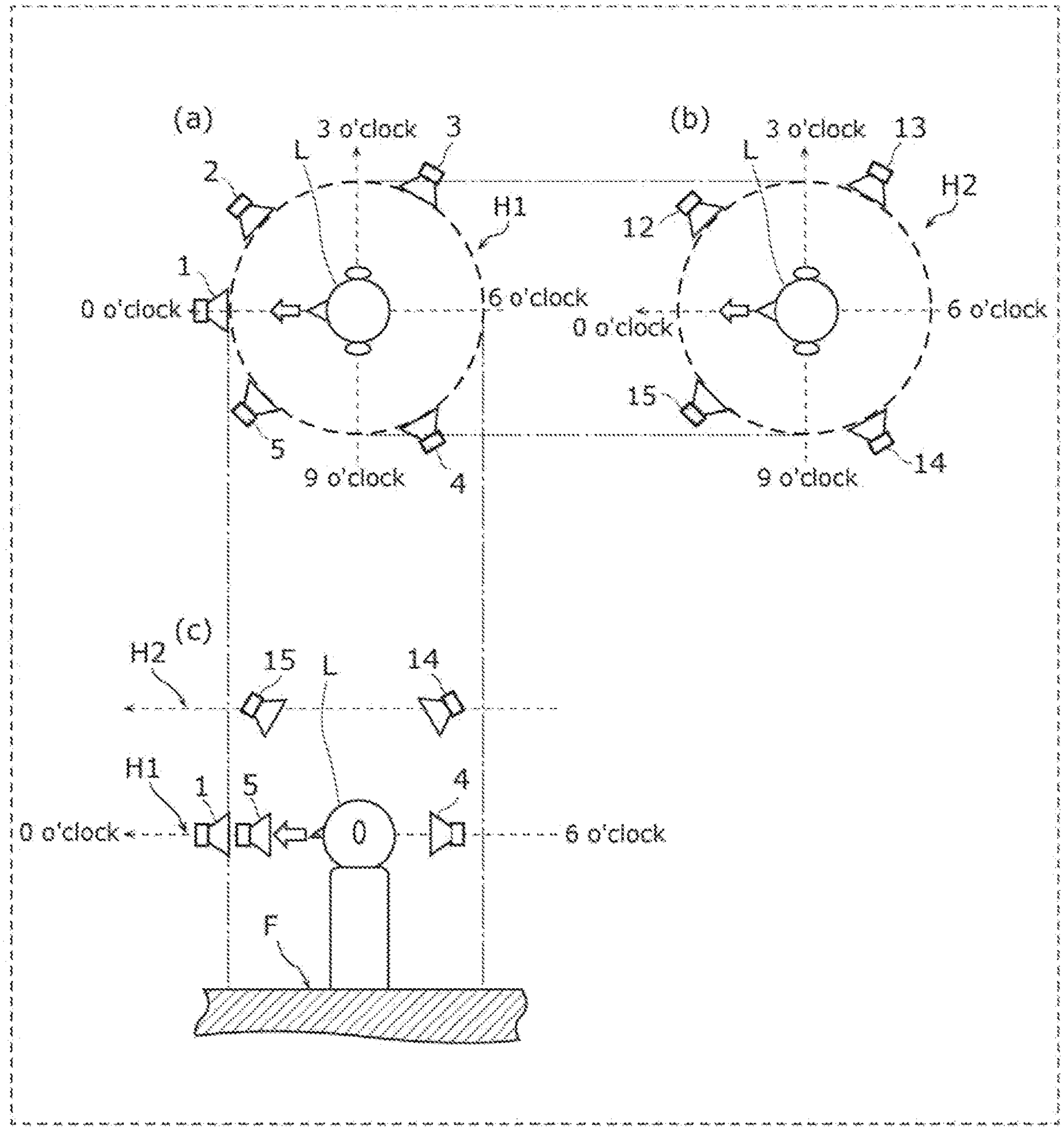
FIG. 15 is a diagram illustrating another example of the correction processing in Operation Example 2 of the embodiment.

As yet another second example, the correction processor may perform the following processing. In this example, for example, a plurality of loudspeakers 1 to 5 and 12 to 15 are used, and correction processing using panning is performed. FIG. 15 is a diagram illustrating another example of the correction processing in Operation Example 2 of the present embodiment. Here, acoustic reproduction device 100 performs processing on a plurality of audio signals acquired, outputs them to loudspeakers 1 to 5 and 12 to 15 in a sound reproduction space shown in FIG. 15, and thereby causing listener L to hear sounds indicated by the audio signals.

(a) and (b) in FIG. 15 are diagrams when the sound reproduction space is viewed in the second direction. (c) in FIG. 15 is a diagram when the sound reproduction space is viewed in the third direction. (a) in FIG. 15 is a diagram showing the arrangement of loudspeakers 1 to 5 at the height of first horizontal plane H1, and (b) in FIG. 15 is a diagram showing the arrangement of loudspeakers 12 to 15 at the height of second horizontal plane H2. Second horizontal plane H2 is a plane which is horizontal to first horizontal plane H1 and is located above first horizontal plane H1. On second horizontal plane H2, loudspeakers 12 to 15 are arranged, and as an example, loudspeaker 12 is arranged in the 1 o'clock direction, loudspeaker 13 is arranged in the 4 o'clock direction, loudspeaker 14 is arranged in the 8 o'clock direction, and loudspeaker 15 is arranged in the 11 o'clock direction.

In this example, the output levels of loudspeakers 12 to 15 arranged on second horizontal plane H2 are adjusted, and the target sound and the ambient sound are output by panning so as to be localized in predetermined positions. In this way, as shown in (b) in FIG. 13, the target sound and the ambient sound are preferably localized.

OTHER EMBODIMENTS

Although the acoustic reproduction device and the acoustic reproduction method according to the present disclosure have been described above based on the embodiment, the present disclosure is not limited to the embodiment. For example, other embodiments realized by arbitrarily combining the constituent elements described in the present specifications or excluding some of the constituent elements may be provided as embodiments of the present disclosure. Variations obtained by performing, on the embodiment described above, various variations conceived by a person skilled in the art without departing from the spirit of the present disclosure, that is, meanings indicated by recitation in the scope of claims are also included in the present disclosure.

Embodiments which will be described below may also be included as one or a plurality of embodiments of the present disclosure.

(1) A part of the constituent elements of the acoustic reproduction device described above may be a computer system which includes a microprocessor, a ROM, a RAM, a hard disk unit, a display unit, a keyboard, a mouse, and the like. In the RAM or the hard disk unit, computer programs are stored. The microprocessor is operated according to the computer programs to achieve its functions. Here, a computer program is formed by combining a plurality of command codes indicating instructions for a computer in order to achieve a predetermined function.

(2) A part of the constituent elements of the acoustic reproduction device and the acoustic reproduction method described above may be formed using one system large scale integration (LSI) circuit. The system LSI circuit is an ultra-multifunctional LSI circuit manufactured by integrating a plurality of constituent portions on one chip, and is specifically a computer system which includes a microprocessor, a ROM, a RAM and the like. In the RAM, computer programs are stored. The microprocessor is operated according to the computer programs, and thus the system LSI circuit achieves its functions.

(3) A part of the constituent elements of the acoustic reproduction device described above may be formed using an IC card which is removable from each device or a single module. The IC card or the module is a computer system which includes a microprocessor, a ROM, a RAM and the like. The IC card or the module may include the ultra-multifunctional LSI circuit described above. The microprocessor is operated according to computer programs, and thus the IC card or the module achieves its functions. The IC card or the module may be tamper-resistant.

(4) A part of the constituent elements of the acoustic reproduction device described above may be the computer programs or digital signals stored in a computer-readable recording medium, and examples of the computer-readable recording medium include a flexible disk, a hard disk, a CD-ROM, an MO, a DVD, a DVD-ROM, a DVD-RAM, a Blu-ray (registered trademark) disc (BD), a semiconductor memory, and the like. A part of the constituent elements of the acoustic reproduction device described above may be digital signals stored in these recording media.

A part of the constituent elements of the acoustic reproduction device described above may transmit the computer programs or the digital signals via a network, data broadcasting, or the like such as a telecommunications line, a wireless or wired communication line, or the Internet.

(5) The present disclosure may be the methods described above. The present disclosure may also be computer programs which cause a computer to realize these methods or may also be digital signals formed by the computer programs.

(6) The present disclosure may also be a computer system which includes a microprocessor and a memory, the memory may store the computer programs described above, and the microprocessor may be operated according to the computer programs.

(7) The programs or the digital signals are stored in the recording medium and are transferred or the programs or the digital signals are transferred via the network described above or the like, and thus the present disclosure may be practiced using another independent computer system.

(8) The embodiments and the variations described above may be combined.

Although not shown in FIG. 2 and the like, video linked with the sounds output from loudspeakers 1 to 5 may be presented to listener L. In this case, for example, a display device such as a liquid crystal panel or an organic electro luminescence (EL) panel may be provided around listener L, and the video is presented to the display device. Listener L wears a head-mounted display or the like, and thus the video may be presented.

Although in the embodiments described above, as shown in FIG. 2, five loudspeakers 1 to 5 are provided, the present disclosure is not limited to this configuration. For example, a 5.1*ch* surround system may be utilized in which five loudspeakers 1 to 5 described above and a loudspeaker for a subwoofer are provided. Although a multichannel surround system in which two loudspeakers are provided may be utilized, the present disclosure is not limited to this configuration.

Although in the present embodiment, acoustic reproduction device 100 is utilized in a state where listener L stands on the floor surface, the present disclosure is not limited to this configuration. Acoustic reproduction device 100 may be utilized in a state where listener L is seated on the floor surface or seated on a chair or the like arranged on the floor surface.

Although in the present embodiment, the floor surface of the sound reproduction space is a surface parallel to the horizontal plane, the present disclosure is not limited to this configuration. For example, the floor surface of the sound reproduction space may be an inclined surface which is parallel to a plane inclined with respect to the horizontal plane. When acoustic reproduction device 100 is utilized in a state where listener L stands on the inclined surface, the second direction may be a direction toward listener L from above listener L along a direction perpendicular to the inclined surface.

INDUSTRIAL APPLICABILITY

The present disclosure can be utilized for audio signal processing devices and acoustic reproduction methods, and can be particularly applied to stereophonic acoustic reproduction systems and the like.

The invention claimed is:

1. An acoustic reproduction method comprising:

acquiring a first audio signal corresponding to an ambient sound that arrives at a listener from a first range which is a range of a first angle in a sound reproduction space and a second audio signal corresponding to a target sound that arrives at the listener from a point in a first direction in the sound reproduction space;

acquiring direction information about a direction in which a head of the listener faces;

performing, when a back range relative to a front range in the direction in which the head of the listener faces is determined to include the first range and the point based on the direction information acquired, correction processing on at least one of the first audio signal acquired or the second audio signal acquired such that the first range does not overlap the point when the sound reproduction space is viewed in a predetermined direction; and mixing at least one of the first audio signal on which the correction processing has been performed or the second audio signal on which the correction processing has been performed and outputting, to an output channel, the at least one of the first audio signal or the second audio signal which has undergone the mixing.

2. The acoustic reproduction method according to claim 1, wherein the first range is a back range relative to a reference direction which is determined by a position of the output channel.

3. The acoustic reproduction method according to claim 1, wherein the predetermined direction is a second direction toward the listener from above the listener.

4. The acoustic reproduction method according to claim 3, wherein the first range indicated by the first audio signal on which the correction processing has been performed includes: a second range that is a range of a second angle; and a third range that is a range of a third angle different from the second angle, the ambient sound arrives at the listener from the second range and the third range, and when the sound reproduction space is viewed in the second direction, the second range does not overlap the point, and the third range does not overlap the point.

5. The acoustic reproduction method according to claim 1, wherein the predetermined direction is a third direction toward the listener from a side of the listener.

6. The acoustic reproduction method according to claim 5, wherein when the sound reproduction space is viewed in the third direction, the ambient sound indicated by the first audio signal acquired arrives at the listener from the first range that is a range of a fourth angle in the sound reproduction space, and the target sound indicated by the second audio signal acquired arrives at the listener from the point in a fourth direction in the sound reproduction space, and in the performing of the correction processing, when the fourth direction is determined to be included in the fourth angle, the correction processing is performed on the at least one of the first audio signal acquired or the second audio signal acquired such that the fourth direction does not overlap the first range when the sound reproduction space is viewed in the third direction.

7. The acoustic reproduction method according to claim 1, wherein the correction processing is processing that adjusts an output level of the at least one of the first audio signal acquired or the second audio signal acquired.

8. The acoustic reproduction method according to claim 1, wherein in the mixing, the at least one of the first audio signal on which the correction processing has been performed or the second audio signal on which the correction processing has been performed is mixed, and the at least one of the first audio signal or the second audio signal which has undergone the mixing is output to a plurality of output channels each being the output channel, and the correction processing is processing that adjusts an output level of the at least one of the first audio signal acquired or the second audio signal acquired in each of the plurality of output channels, the each of the plurality of output channels outputting the at least one of the first audio signal or the second audio signal.

9. The acoustic reproduction method according to claim 8, wherein the correction processing is processing that adjusts, based on an output level of the first audio signal corresponding to the ambient sound arriving at the listener from the first range, an output level in each of the plurality of output channels, the each of the plurality of output channels outputting the second audio signal.

10. The acoustic reproduction method according to claim 1, wherein the correction processing is processing that adjusts an angle corresponding to a head-related transfer function which is convoluted into the at least one of the first audio signal acquired or the second audio signal acquired.

11. The acoustic reproduction method according to claim 10, wherein the correction processing is processing that adjusts, based on an angle corresponding to a head-related transfer function which is convoluted into the first audio signal such that the ambient sound indicated by the first audio signal arrives at the listener from the first range, an angle corresponding to a head-related transfer function which is convoluted into the second audio signal.

12. A non-transitory computer-readable recording medium having recorded thereon a computer program for causing a computer to execute the acoustic reproduction method according to claim 1.

13. An acoustic reproduction device comprising:

a signal acquirer that acquires a first audio signal corresponding to an ambient sound that arrives at a listener from a first range which is a range of a first angle in a sound reproduction space and a second audio signal corresponding to a target sound that arrives at the listener from a point in a first direction in the sound reproduction space;

an information acquirer that acquires direction information about a direction in which a head of the listener faces;

a correction processor that performs, when a back range relative to a front range in the direction in which the head of the listener faces is determined to include the first range and the point based on the direction information acquired, correction processing on at least one of the first audio signal acquired or the second audio signal acquired such that the first range does not overlap the point when the sound reproduction space is viewed in a predetermined direction; and a mixing processor that mixes at least one of the first audio signal on which the correction processing has been performed or the second audio signal on which the correction processing has been performed and outputs, to an output channel, the at least one of the first audio signal or the second audio signal which has undergone the mixing.

* * * * *